United States Patent
Lu

(10) Patent No.: US 12,389,330 B2
(45) Date of Patent: Aug. 12, 2025

(54) POWER MANAGEMENT TECHNIQUES FOR WAKING-UP PROCESSORS IN MEDIA PLAYBACK SYSTEMS

(71) Applicant: Sonos, Inc., Santa Barbara, CA (US)

(72) Inventor: Cheng Lu, Malden, MA (US)

(73) Assignee: Sonos, Inc., Goleta, CA (US)

( * ) Notice: Subject to any disclaimer, the term of this patent is extended or adjusted under 35 U.S.C. 154(b) by 85 days.

(21) Appl. No.: 17/423,812

(22) PCT Filed: Jan. 17, 2020

(86) PCT No.: PCT/US2020/014072
§ 371 (c)(1),
(2) Date: Jul. 16, 2021

(87) PCT Pub. No.: WO2020/150595
PCT Pub. Date: Jul. 23, 2020

(65) Prior Publication Data
US 2022/0086758 A1   Mar. 17, 2022

Related U.S. Application Data

(60) Provisional application No. 62/794,222, filed on Jan. 18, 2019.

(51) Int. Cl.
*H04W 52/02* (2009.01)
(52) U.S. Cl.
CPC ... *H04W 52/0229* (2013.01); *H04W 52/0251* (2013.01); *H04W 52/0254* (2013.01); *H04W 52/0274* (2013.01); *H04W 52/028* (2013.01)

(58) Field of Classification Search
None
See application file for complete search history.

(56) References Cited

U.S. PATENT DOCUMENTS

| | | | |
|---|---|---|---|
| 5,440,644 | A | 8/1995 | Farinelli et al. |
| 5,761,320 | A | 6/1998 | Farinelli et al. |

(Continued)

FOREIGN PATENT DOCUMENTS

| | | | |
|---|---|---|---|
| CN | 1452044 A | 10/2003 | |
| CN | 105723780 A | 6/2016 | |

(Continued)

OTHER PUBLICATIONS

Audio Tron Quick Start Guide, Version 1.0, Mar. 2001, 24 pages.

(Continued)

*Primary Examiner* — Jutai Kao

(57) ABSTRACT

According to at least one aspect, power management techniques are disclosed that may reduce the power consumption of devices, such as those devices in media playback systems, without introducing a noticeable lag between a user issuing a command and the device processing the command. In some embodiments, the device may put to sleep (including turn off) electronic components that are only used for specific commands. In these embodiments, the devices may identify periods where the specific commands are likely to be invoked and, in response to identifying such a period, wake-up the electronic components. As a result, the power consumption of the device may be substantially reduced because various electronic components may be put to sleep instead of remaining idle in an awake state.

20 Claims, 10 Drawing Sheets

(56) References Cited

U.S. PATENT DOCUMENTS

| | | |
|---|---|---|
| 5,923,902 A | 7/1999 | Inagaki |
| 6,032,202 A | 2/2000 | Lea et al. |
| 6,256,554 B1 | 7/2001 | Dilorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| 7,295,548 B2 | 11/2007 | Blank et al. |
| 7,391,791 B2 | 6/2008 | Balassanian et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington |
| 8,483,853 B1 | 7/2013 | Lambourne |
| 8,942,252 B2 | 1/2015 | Balassanian et al. |
| 9,904,508 B1* | 2/2018 | Drinkwater ............. H04L 65/61 |
| 10,102,855 B1 | 10/2018 | Sindhwani |
| 10,127,906 B1 | 11/2018 | Mutagi et al. |
| 10,813,066 B2* | 10/2020 | Daley .................... H04H 20/38 |
| 10,877,637 B1 | 12/2020 | Antos et al. |
| 11,100,922 B1 | 8/2021 | Mutagi et al. |
| 11,178,716 B2 | 11/2021 | Baik et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty, Jr. |
| 2004/0024478 A1 | 2/2004 | Hans et al. |
| 2004/0078066 A1* | 4/2004 | Ohta ................... G11B 20/0084 607/60 |
| 2007/0142944 A1 | 6/2007 | Goldberg et al. |
| 2009/0097428 A1 | 4/2009 | Kneckt et al. |
| 2010/0141400 A1* | 6/2010 | Radulescu ........ H04W 52/0225 340/10.33 |
| 2014/0323036 A1 | 10/2014 | Daley et al. |
| 2015/0095680 A1 | 4/2015 | Gossain et al. |
| 2016/0088550 A1* | 3/2016 | Rabii .................... H04W 72/02 370/310 |
| 2016/0165544 A1* | 6/2016 | Pefkianakis ...... H04W 52/0254 370/311 |
| 2016/0373909 A1 | 12/2016 | Rasmussen et al. |
| 2017/0146689 A1* | 5/2017 | Kryszczynski ...... G10K 11/004 |
| 2017/0330429 A1 | 11/2017 | Tak et al. |
| 2017/0347331 A1 | 11/2017 | Daley et al. |
| 2018/0035365 A1* | 2/2018 | Koratekere Honnappa ................ H04W 48/16 |
| 2018/0317193 A1 | 11/2018 | Daley et al. |
| 2019/0379723 A1* | 12/2019 | Demasi ............... G06F 9/45533 |
| 2020/0275250 A1 | 8/2020 | Choi et al. |

FOREIGN PATENT DOCUMENTS

| | | |
|---|---|---|
| CN | 107079403 A | 8/2017 |
| EP | 1389853 A1 | 2/2004 |
| EP | 2905967 A1 | 8/2015 |
| WO | 200153994 | 7/2001 |
| WO | 2003093950 A2 | 11/2003 |

OTHER PUBLICATIONS

Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
PCT International Searching Authority, International Search Report and Written Opinion mailed on May 6, 2020, issued in connection with International Application No. PCT/US2020/014072, 10 pages.
Canadian Patent Office, Canadian Examination Report mailed on Dec. 12, 2023, issued in connection with Canadian Application No. 3126937, 4 pages.
Australian Patent Office, Australian Examination Report Action mailed on Oct. 22, 2024, issued in connection with Australian Application No. 2020209936, 4 pages.
Canadian Patent Office, Canadian Examination Report mailed on Sep. 9, 2024, issued in connection with Canadian Application No. 3126937, 5 pages.
Chinese Patent Office, First Office Action and Translation mailed on Mar. 27, 2025, issued in connection with Chinese Application No. 202080021971.8, 28 pages.

* cited by examiner

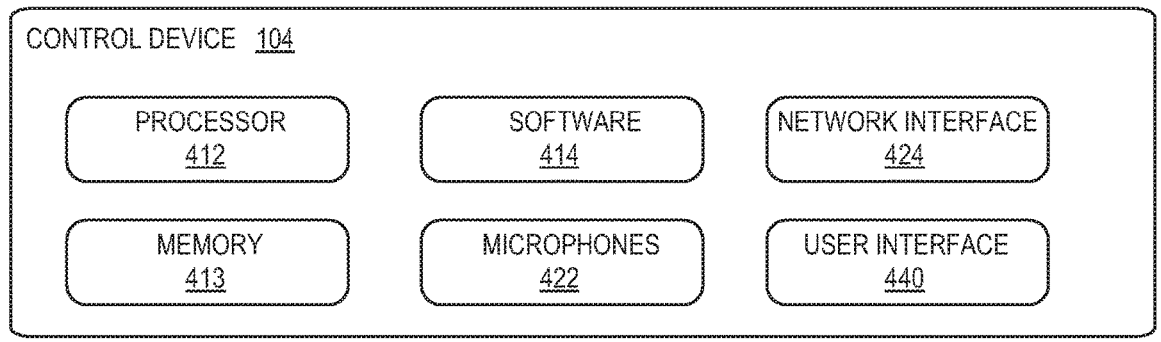
Figure 4A
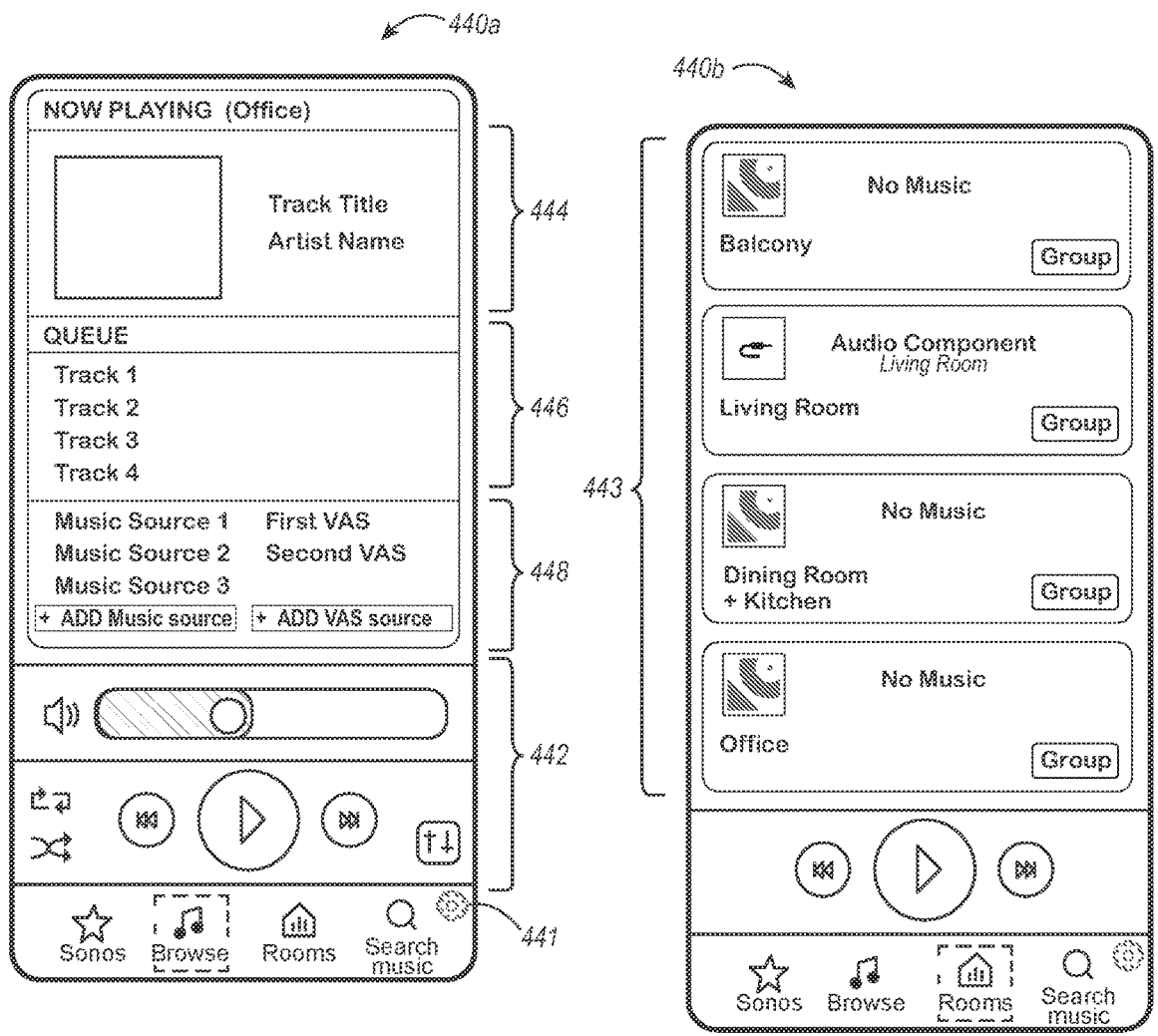
Figure 4B
Figure 4C

POWER MANAGEMENT TECHNIQUES FOR WAKING-UP PROCESSORS IN MEDIA PLAYBACK SYSTEMS

CROSS REFERENCE TO RELATED APPLICATIONS

This application is a national stage application under 35 U.S.C. § 371 of International Application No. PCT/US2020/014072, filed Jan. 17, 2020, which claims priority to U.S. Provisional Patent Application No. 62/794,222, filed on Jan. 18, 2019, titled "POWER MANAGEMENT TECHNIQUES FOR MEDIA PLAYBACK SYSTEMS," the disclosures of each of which are incorporated herein by reference in their entirety.

TECHNICAL FIELD

The present technology relates to consumer goods and, more particularly, to methods, systems, products, features, services, and other elements directed to media playback systems or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The SONOS Wireless HiFi System enables people to experience music from many sources via one or more networked playback devices. Through a software control application installed on a smartphone, tablet, or computer, one can play what he or she wants in any room that has a networked playback device. Additionally, using a controller, for example, different songs can be streamed to each room that has a playback device, rooms can be grouped together for synchronous playback, or the same song can be heard in all rooms synchronously.

Given the ever-growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings.

FIG. 4A is a functional block diagram of an example controller device in accordance with aspects of the disclosure.

FIGS. 4B and 4C are controller interfaces in accordance with aspects of the disclosure.

Figure 1A:
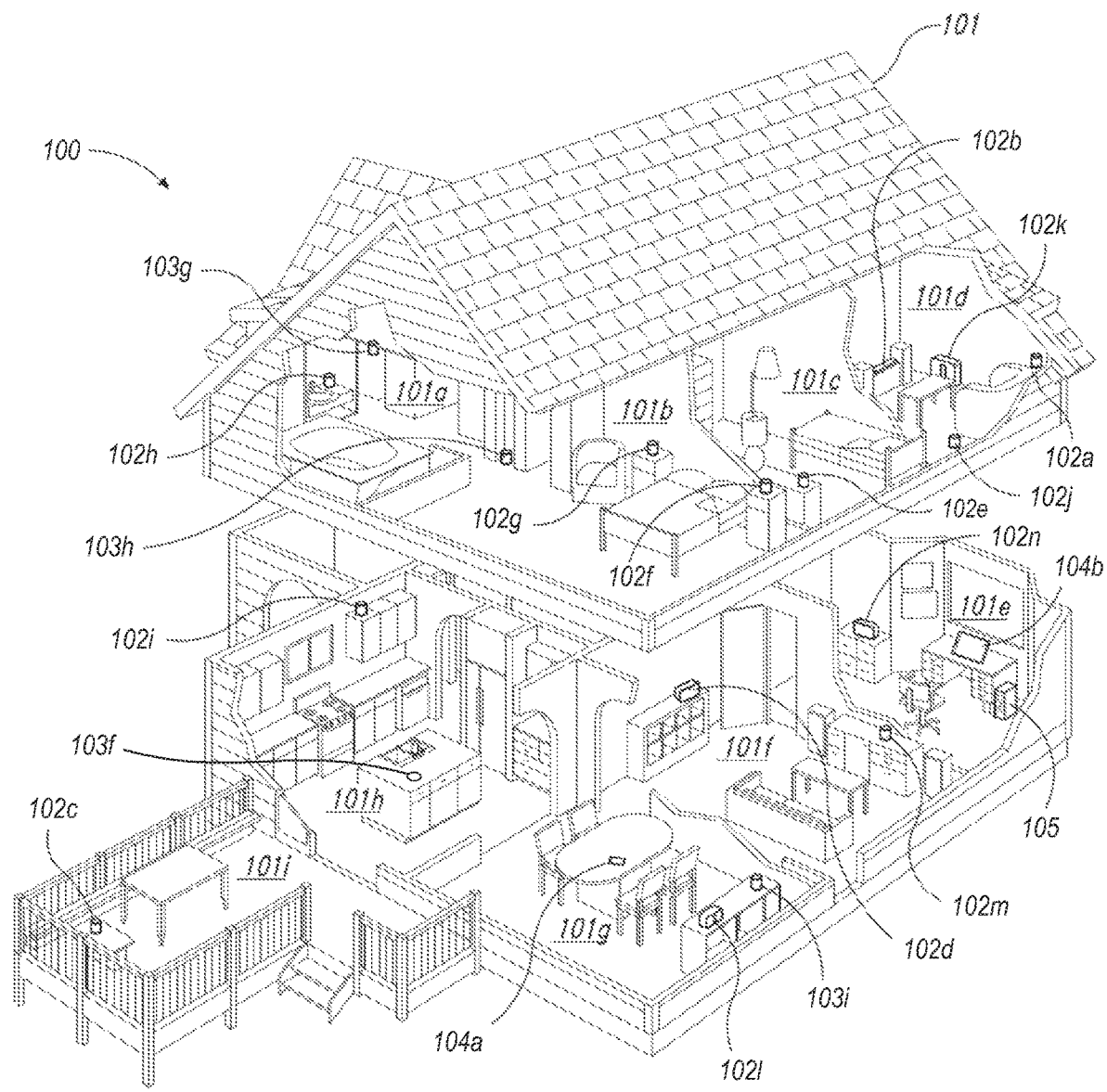
FIG. 1A is a partial cutaway view of an environment having a media playback system configured in accordance with aspects of the disclosed technology.

The drawings are for purposes of illustrating example embodiments, but it should be understood that the inventions are not limited to the arrangements and instrumentality shown in the drawings. In the drawings, identical reference numbers identify at least generally similar elements. To facilitate the discussion of any particular element, the most significant digit or digits of any reference number refers to the Figure in which that element is first introduced. For example, element 103a is first introduced and discussed with reference to FIG. 1A.

DETAILED DESCRIPTION

I. Overview

Consumers typically expect devices to execute a command nearly instantaneously after the command has been issued. For example, consumers expect a mobile phone to open an application within one second of activating the icon associated with the application. Further, consumers generally presume that the device is malfunctioning should the command require more than a few seconds to be executed. For example, consumers may presume that the device has frozen when an application takes longer than three seconds to open after activating the icon associated with the application. As a result, device manufacturers typically design devices to be able to execute commands nearly instantly after receipt at any time.

One challenge with conventional designs that enable the device to quickly execute commands from a user at any time is that this may adversely impact the power consumption of the device. For example, a conventional device may maintain full power to many of the electronic components (e.g., processor(s), memory, etc.) within the device regardless of whether the electronic components are sitting idle. Maintaining full power to such electronic components avoids the delay that may occur when an electronic device transitions from a sleep state to an awake state, which may be quite substantial. For example, the time for a processor to transition from a fully off state to an awake state and establish a connection with a wireless network may be approximately 10 seconds. Such a lengthy period of time to perform a simple command (e.g., connecting to a wireless network) would be intolerable to users. As a result, conventional devices typically maintain full power to many electronic components so as to provide the desired user experience.

A related challenge with such conventional devices is that they may maintain power to electronic components that are sitting idle for substantial periods of time. For example, a conventional device may comprise a processor that is only used when specific commands are invoked (e.g., streaming music over a wireless network) and left idle for all other commands (e.g., playing music received from a 3.5 millimeter audio cable). The conventional device may always maintain power to the processor so as to be able to execute the specific commands (e.g., streaming music over the wireless network) nearly instantly. As a result, the user experiences little or no lag when issuing a specific command that invokes the processor (e.g., a command to stream music over the wireless network). However, the conventional device wastes a significant amount of power by maintaining power to the processor for long periods of time when the specific commands are not invoked (e.g., periods where the user only plays music received from the 3.5 millimeter audio cable).

Accordingly, aspects of the present disclosure relate to power management techniques that may reduce the power consumption of devices without noticeably increasing the lag between a user issuing a command and the device executing the command. Thus, the power consumption of the device is reduced without negatively impacting the user experience. In some embodiments, the device may put to sleep (including turn off) electronic components that are only used for specific commands. In these embodiments, the devices may identify periods where the specific commands are likely to be invoked and, in response to identifying such a period, wake-up the electronic components. For example, a device may include a processor that is employed for streaming music over a wireless network. In this example, the device may turn off the processor to save power and employ network interface components (e.g., a WI-FI chip) to search for known wireless networks. When a known wireless network is located, the device may determine that a command to stream music over the wireless network is likely to be received from the user. Accordingly, the device may wake-up the processor and/or connect to the wireless network in anticipation of receiving a command from the user to stream music over the wireless network. Thus, the device may expeditiously execute a command from the user to stream music over the wireless network. Should the device lose the connection to the wireless network (e.g., get out of range of the wireless network), the device may put the processor back to sleep. As a result, the power consumption of the device may be substantially reduced because the processor is asleep for the entire period of time where a wireless network is not within range (and a command to stream music over the Internet is unlikely).

The power management techniques described herein may be readily applied to any of a variety of devices. The power management techniques may be applied to, for example, playback devices that are configured to playback audio content. The playback device may comprise one or more processing components that cause the playback device to perform various operations. The one or more processing components may include a processor (e.g., a general-purpose processor (GPP)) that has a plurality of power states including an awake state and one or more sleep states such as a light sleep state and/or a deep sleep state. The processor may be kept in a sleep state when commands that invoke the processor are unlikely to be received and transition the processor from a sleep state to an awake state when commands that invoke the processor are likely to be received. In awake states, the processor may be capable of executing instructions, power may be maintained to the processor caches (e.g., L1, L2, and/or L3 caches), and the clocks may be on (e.g., core clock, bus clock, etc.). In light sleep states, the power consumption may be reduced relative to the awake states by turning off one or more clocks while maintaining power to the processor caches. Thus, light sleep states may offer some power consumption reduction relative to awake states while still being able to transition to awake states expeditiously. In deep sleep states, the power consumption may be reduced relative to the light sleep states by both turning off one or more clocks and powering down one or more processor caches. Deep sleep states may include those states where the processor is entirely powered off. Thus, deep sleep states may offer an additional power consumption reduction relative to light sleep states and require additional time to transition to awake states relative to light sleep states.

The playback device may further include various electronic components coupled to the one or more processing components to facilitate playback of audio content. For example, the playback device may comprise one or more amplifiers that are configured to drive one or more speakers. In some embodiments, the one or more speakers may be external to the playback device. For example, the one or more speakers may be cabinet speakers that are coupled to the playback device using speaker wire or other wired or wireless connectors. In other embodiments, the one or more speakers may be integrated with the playback device. For example, the playback device may be implemented as a wireless speaker.

The playback device may further include one or more network interface components that are coupled to the one or more processing components to facilitate communication over a wireless network using one or more communication protocols. For example, the network interface components may be capable of wirelessly communicating with a first computing device over a first wireless network (e.g., cellular network and/or a wireless local area network (WLAN)) and wirelessly communicating with a second computing device over another network, such as a BLUETOOTH network. The network interface components may comprise one or more network circuits configured to determine whether a wireless network is within range and provide an output signal to the one or more processing components when the wireless network is within range. The network circuits may determine whether the wireless network is within range by, for example, broadcasting probe requests for wireless networks and analyzing the received response messages. Should a response message originate from a known wireless network and have a signal strength that is sufficiently high to establish a stable connection, the network circuit may determine that the wireless network is within range and provide the output signal. Otherwise, the network circuit may determine that the wireless network is not within range and continue sending probe requests.

The output signal from the network circuit may trigger the one or more processing components to perform any of a variety of operations. For example, the output signal may indicate that a known wireless network is in range and the user is likely to issue a command to stream music over the wireless network. Thus, the one or more processing components may ready the components responsible for handling streaming music in anticipation of receiving such a command. Accordingly, in some embodiments, the one or more processing components may transition the processor from a sleep state (e.g., a deep sleep state or light sleep state) to an awake state. Once the processor is in the awake state, the processor may be employed to communicate over the wireless network with a computing device. For example, the processor may communicate over the wireless network with a network router to obtain network configuration information (e.g., an Internet Protocol (IP) address of the network router, keys used to encrypt and/or decrypt messages, etc.) that may be employed for subsequent communication over the wireless network. Such network configuration information may be stored for subsequent retrieval to advantageously reduce the time required to initiate communication over the wireless network. Additionally, the processor may communicate with a server over the Internet to obtain registration information (e.g., security tokens) that may be employed for subsequent communication with one or more cloud servers (e.g., cloud servers accessed to obtain an audio stream). Similarly, such registration information may be stored for subsequent retrieval to, for example, advantageously reduce the time required to access an audio stream for playback. Still yet further, the processor may communicate with another playback device on the same network (e.g., another playback device on the same LAN) to obtain player state information regarding other nearby playback devices, such as what song was last played by the other playback devices. Such player state information may be stored for subsequent retrieval to, for example, advantageously reduce the time required to continue playback of the last song played on another playback device.

After the one or more processing components have woken-up the processor and communicated over the wireless network, the one or more processing components may receive a command to start streaming music from an audio source over the wireless network. Once the one or more processing components receive the command to start streaming music, the one or more processing components may use the processor to obtain the audio content. The processor may obtain the audio content by, for example, retrieving the stored network configuration information and registration information from memory, communicating over the wireless network using the network configuration information, and communicating with one or more cloud servers using the registration information to obtain the audio content. Once the audio content has been obtained, the one or more processing components may initiate playback of the audio content via the one or more amplifiers and the one or more speakers.

While some embodiments described herein may refer to functions performed by given actors, such as "users" and/or other entities, it should be understood that this description is for purposes of explanation only. The claims should not be interpreted to require action by any such example actor unless explicitly required by the language of the claims themselves.

II. Example Operating Environment

Figure 1B:
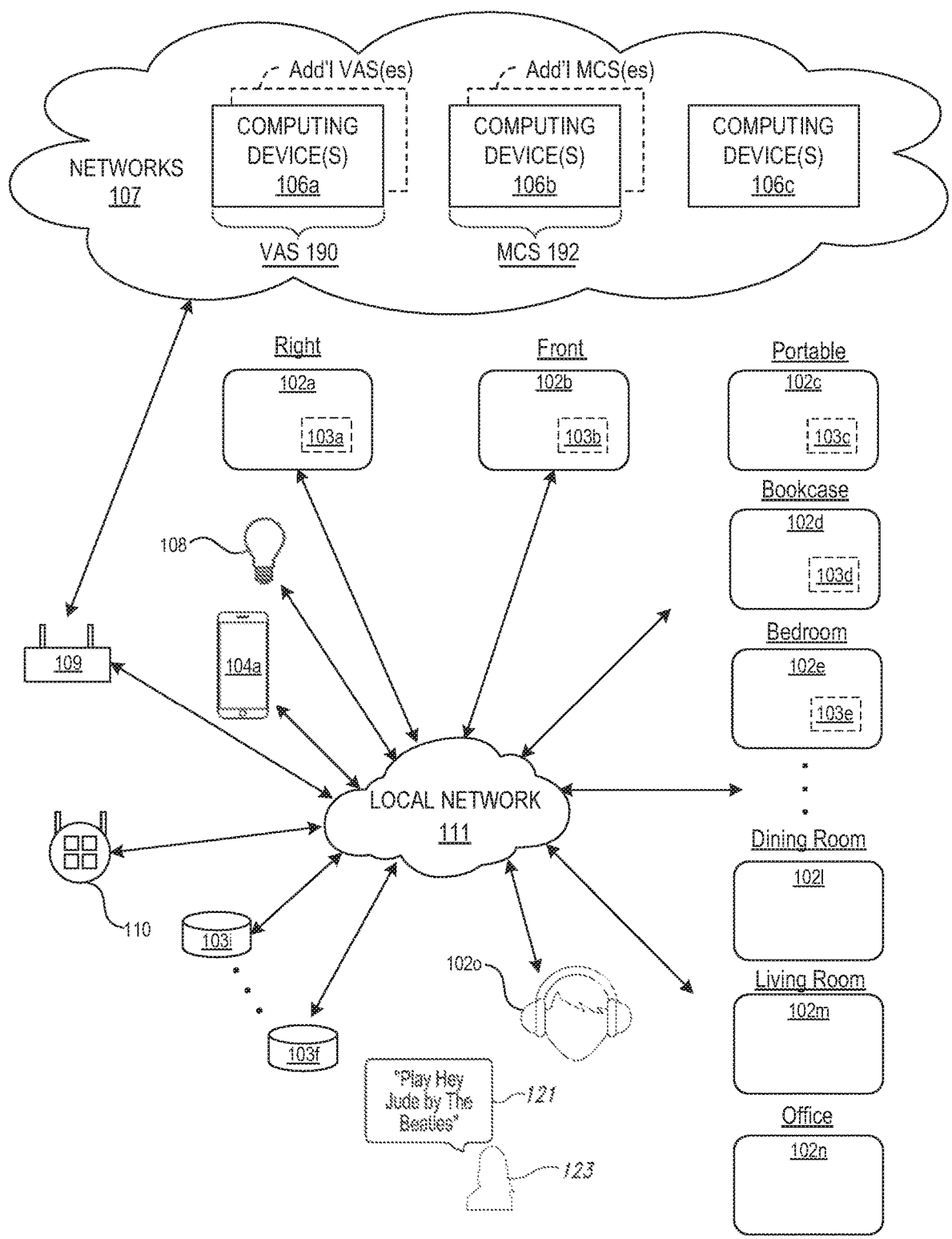
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101a, a master bedroom 101b (referred to herein as "Nick's Room"), a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102a-102o), network microphone devices 103 (identified individually as "NMDs" 103a-102i), and controller devices 104a and 104b (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In embodiments described below, one or more of the various playback devices 102 may be configured as portable playback devices, while others may be configured as stationary playback devices. For example, the headphones 102o (FIG. 1B) are a portable playback device, while the playback device 102d on the bookcase may be a stationary device. As another example, the playback device 102c on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102-104 and/or other network devices of the MPS 100 may be coupled to one another via point-to-point connections and/or over other connections, which may be wired and/or wireless, via a local network 111 that may include a network router 109. For example, the playback device 102j in the Den 101d (FIG. 1A), which may be designated as the "Left" device, may have a point-to-point connection with the playback device 102a, which is also in the Den 101d and may be designated as the "Right" device. In a related embodiment, the Left playback device 102j may communicate with other network devices, such as the playback device 102b, which may be designated as the "Front" device, via a point-to-point connection and/or other connections via the local network 111. The local network 111 may be, for example, a network that interconnects one or more devices within a limited area (e.g., a residence, an office building, a car, an individual's workspace, etc.). The local network 111 may include, for example, one or more local area network (LANs) such as wireless local area networks (WLANs) (e.g., WI-FI networks, Z-WAVE networks, etc.) and/or one or more personal area networks (PANs) such as BLUETOOTH networks, wireless USB networks, ZIGBEE networks, and IRDA networks.

As further shown in FIG. 1B, the MPS 100 may be coupled to one or more remote computing devices 106 via a wide area network ("WAN") 107. In some embodiments, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a voice assistant service ("VAS") and at least one remote computing device associated with a media content service ("MCS"). For instance, in the illustrated example of FIG. 1B, remote computing devices 106a are associated with a VAS 190 and remote computing devices 106b are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, NUANCE, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106c configured to perform certain operations, such as remotely facilitating media playback functions, managing device and system status information, directing communications between the devices of the MPS 100 and one or multiple VASes and/or MCSes, among other operations. In one example, the remote computing devices 106c provide cloud servers for one or more SONOS Wireless HiFi Systems.

In various implementations, one or more of the playback devices 102 may take the form of or include an on-board (e.g., integrated) network microphone device. For example, the playback devices 102a-e include or are otherwise equipped with corresponding NMDs 103a-e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103f and 103g may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102d because it is physically situated on a bookcase. Similarly, the NMD 103f may be assigned the named "Island" because it is physically situated on an island countertop in the Kitchen 101h (FIG. 1A). Some playback devices may be assigned names according to a zone or room, such as the playback devices 102e, 102l, 102m, and 102n, which are named "Bedroom," "Dining Room," "Living Room," and "Office," respectively. Further, certain playback devices may have functionally descriptive names. For example, the playback devices 102a and 102b are assigned the names "Right" and "Front," respectively, because these two devices are configured to provide specific audio channels during media playback in the zone of the Den 101d (FIG. 1A). The playback device 102c in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ulti-mately a particular VAS. For example, the NMD may identify whether speech includes a wake word associated with a particular VAS.

In the illustrated example of FIG. 1B, the NMDs 103 are configured to interact with the VAS 190 over the local network 111 and/or the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106c of the MPS 100 may exchange various feedback, information, instructions, and/or related data with the remote computing devices associated with the selected VAS. Such exchanges may be related to or independent of transmitted messages containing voice inputs. In some embodiments, the remote computing device(s) and the media playback system 100 may exchange data via communication paths as described herein and/or using a metadata exchange channel as described in U.S. Patent Publication No. 2017-0242653 published Aug. 24, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102d in the environment 101 (FIG. 1A) is in relatively close proximity to the NMD-equipped Living Room playback device 102m, and both devices 102d and 102m may at least sometimes detect the same sound. In such cases, this may require arbitration as to which device is ultimately responsible for providing detected-sound data to the remote VAS. Examples of arbitrating between NMDs may be found, for example, in previously referenced U.S. Patent Publication No. 2017-0242653.

In certain implementations, an NMD may be assigned to, or otherwise associated with, a designated or default playback device that may not include an NMD. For example, the Island NMD 103f in the Kitchen 101h (FIG. 1A) may be assigned to the Dining Room playback device 102l, which is in relatively close proximity to the Island NMD 103f. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. Patent Publication No. 2017-0242653.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the local network 111 (FIG. 1B) may be eliminated and the single playback device 102 and/or the single NMD 103 may communicate directly with the remote computing devices 106a-d. In some embodiments, a telecommunication network (e.g., an LTE network, a 5G network, etc.) may communicate with the various playback, network microphone, and/or controller devices 102-104 independent of the local network 111.

a. Example Playback & Network Microphone Devices

Figure 2A:
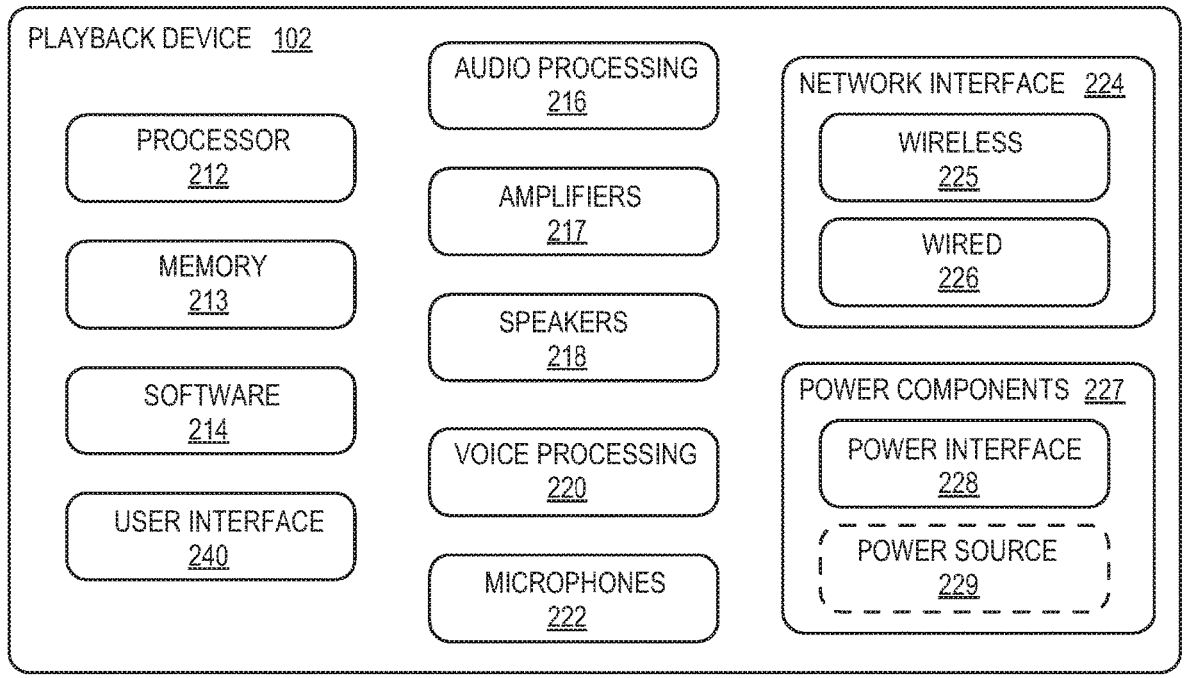
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain embodiments, a playback device may include neither the speakers 218 nor the audio amplifiers 217, but instead may include an audio interface (not shown) for connecting the playback device to an external audio amplifier or audiovisual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.11ad, 802.11af, 802.11ah, 802.11ai, 802.11aj, 802.11aq, 802.11ax, 802.11ay, 802.15, BLUETOOTH, 4G mobile communication standard, 5G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

In some implementations, the voice-processing components 220 may detect and store a user's voice profile, which may be associated with a user account of the MPS 100. For example, voice profiles may be stored as and/or compared to variables stored in a set of command information or data table. The voice profile may include aspects of the tone or frequency of a user's voice and/or other unique aspects of the user's voice, such as those described in previously-referenced U.S. Patent Publication No. 2017-0242653.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various embodiments, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
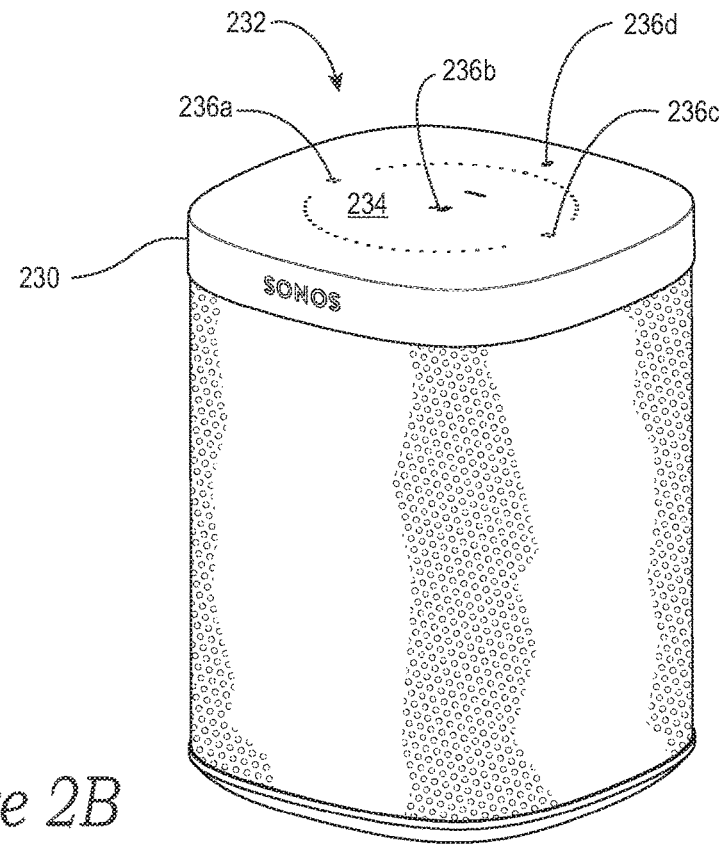
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236a-c for controlling audio playback, volume level, and other functions. The control area 232 also includes a button 236d for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

Figure 2C:
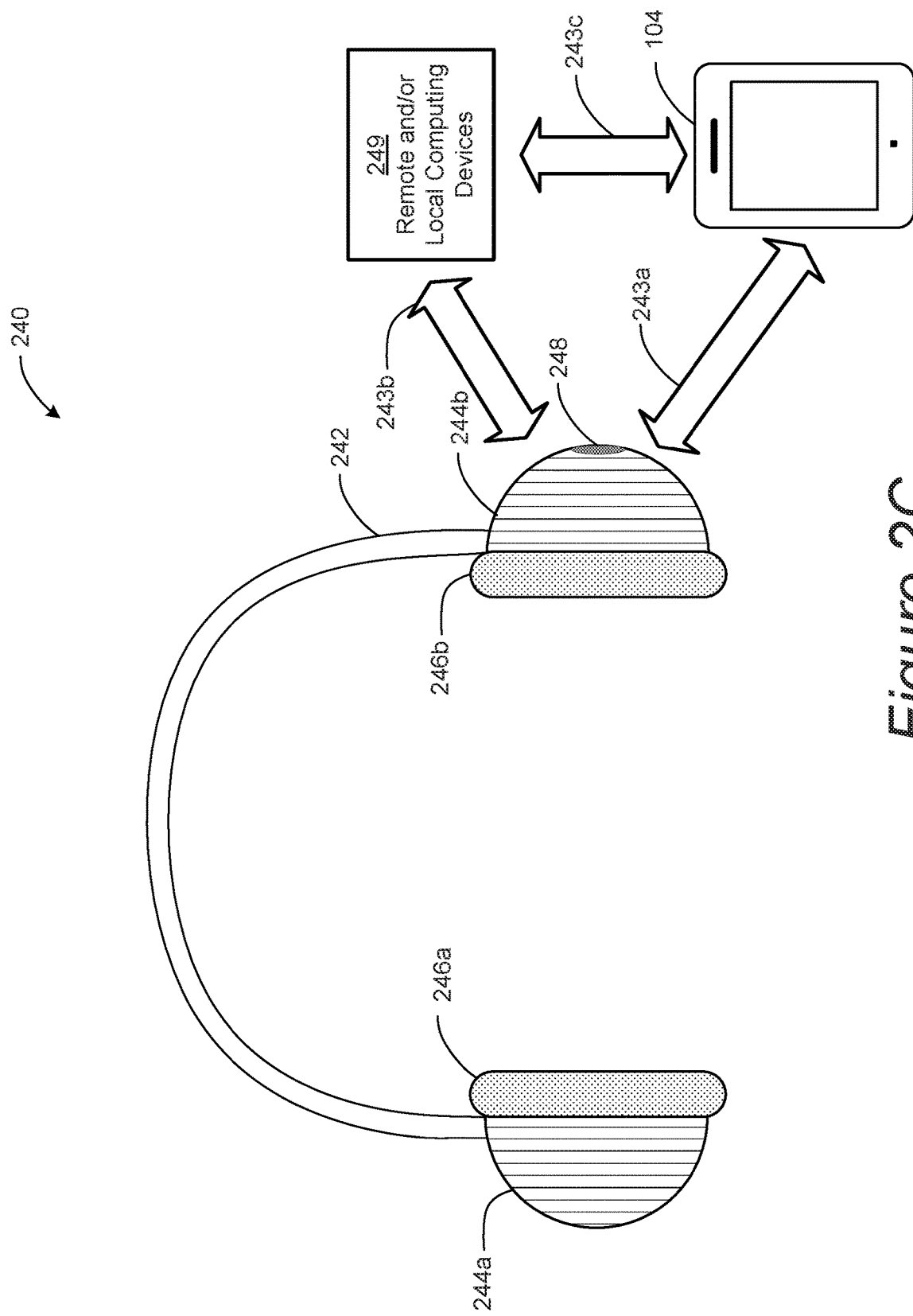
FIG. 2C is a diagram of an example headset assembly for the playback device of FIG. 2A.

In some embodiments, the playback device 102 may take the form of a wired and/or wireless headphone (e.g., an over-ear headset, an on-ear headset, or an in-ear headset). For instance, FIG. 2C shows an example headset assembly 240 ("headset 240") for such an implementation of the playback device 102. As shown, the headset 240 includes a headband 242 that couples a first earcup 244a to a second earcup 244b. Each of the earcups 244a and 244b may house any portion of the electronic components in the playback device 102, such as one or more speakers. Further, one or more of the earcups 244a and 244b may include a user interface for controlling audio playback, volume level, and other functions. The user interface may include any of a variety of control elements such as a physical button 248, a slider, a knob, and/or a touch control surface. As shown in FIG. 2C, the headset 240 may further include ear cushions 246a and 246b that are coupled to ear cups 244a and 244b, respectively. The ear cushions 246a and 246b may provide a soft barrier between the head of a user and the earcups 244a and 244b, respectively, to improve user comfort and/or provide acoustic isolation from the ambient (e.g., passive noise reduction (PNR)).

As described in greater detail below, the electronic components of a playback device may include one or more network interface components (not shown in FIG. 2C) to facilitate wireless communication over one more communication links. For instance, a playback device may communicate over a first communication link 243a (e.g., a BLUETOOTH link) with one of the controller devices 104 and/or over a second communication link 243b (e.g., a WI-FI or cellular link) with one or more other computing devices 249 (e.g., a network router and/or a remote server). As another possibility, a playback device may communicate over multiple communication links, such as the first communication link 243a with the controller device 104 and a third communication link 243c (e.g., a Wi-Fi or cellular link) between the controller device 104 and the one or more other computing devices 249. Thus, the controller device 104 may function as an intermediary between the playback device and the one or more other computing devices 249, in some embodiments.

It should be appreciated that the playback device 102 may take the form of other wearable devices separate and apart from a headphone. Wearable devices may include those devices configured to be worn about a portion of a subject (e.g., a head, a neck, a torso, an arm, a wrist, a finger, a leg, an ankle, etc.). For example, the playback device 102 may take the form of a pair of glasses including a frame front (e.g., configured to hold one or more lenses), a first temple rotatably coupled to the frame front, and a second temple rotatable coupled to the frame front. In this example, the pair of glasses may comprise one or more transducers integrated into at least one of the first and second temples and configured to project sound towards an ear of the subject.

By way of illustration, SONOS, Inc. presently offers (or has offered) for sale certain playback devices that may implement certain of the embodiments disclosed herein, including a "SONOS ONE," "PLAY:1," "PLAY:3," "PLAY:5," "PLAYBAR," "CONNECT:AMP," "PLAYBASE," "BEAM," "CONNECT," and "SUB." Any other past, present, and/or future playback devices may additionally or alternatively be used to implement the playback devices of example embodiments disclosed herein. Additionally, it should be understood that a playback device is not limited to the examples illustrated in FIG. 2A, 2B, or 2C or to the SONOS product offerings. For example, a playback device may include or interact with a docking station for personal mobile media playback devices. In yet another example, a playback device may be integral to another device or component such as a television, a lighting fixture, or some other device for indoor or outdoor use.

b. Example Playback Device Configurations

Figure 3B:
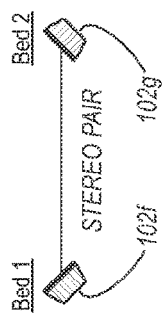
FIGS. 3A, 3B, 3C, 3D, and 3E are diagrams showing example playback device configurations in accordance with aspects of the disclosure.
Figure 3C:
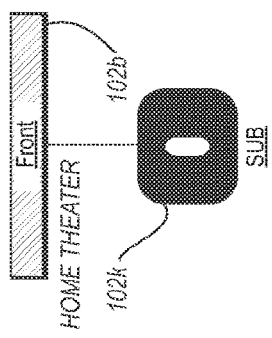
Figure 3D:
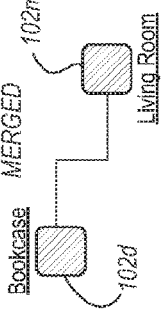
Figure 3E:
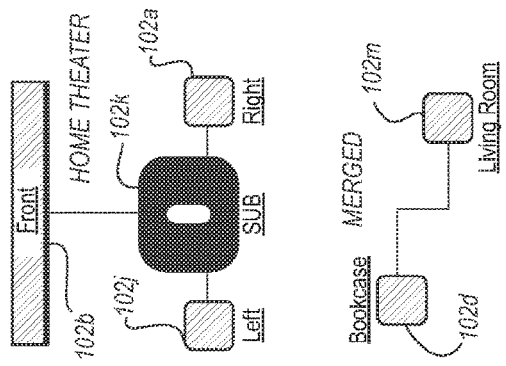
Figure 3A:
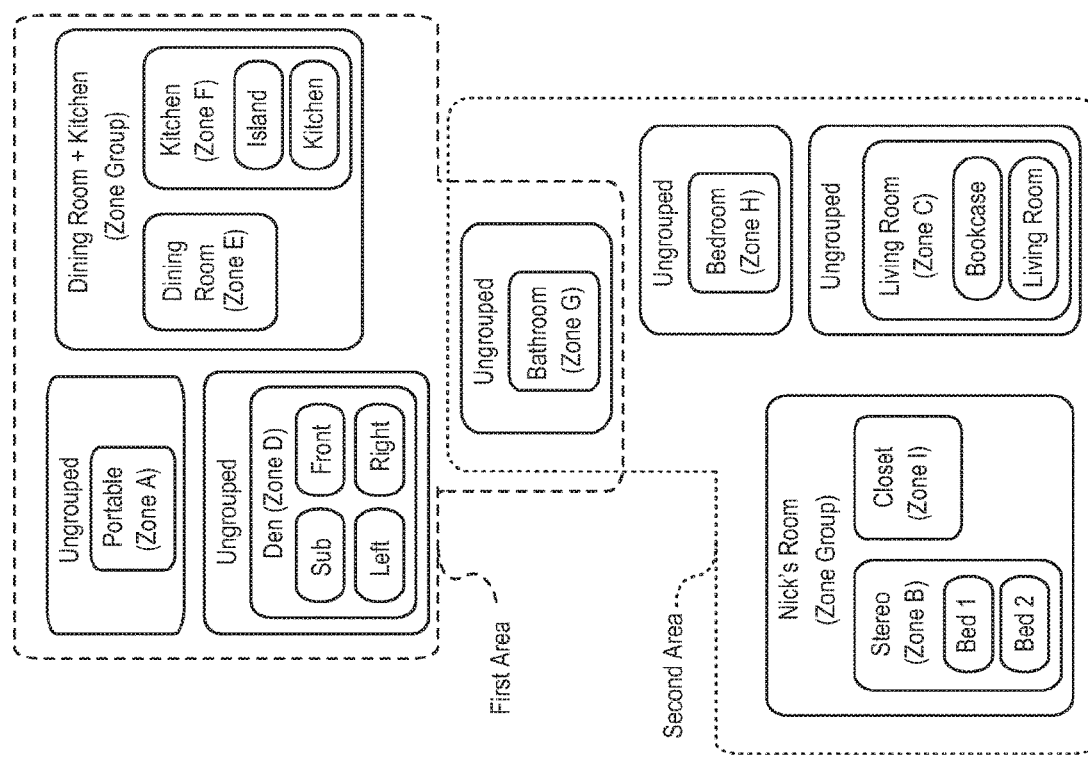

FIGS. 3A-3E show example configurations of playback devices. Referring first to FIG. 3A, in some example instances, a single playback device may belong to a zone. For example, the playback device 102c (FIG. 1A) on the Patio may belong to Zone A. In some implementations described below, multiple playback devices may be "bonded" to form a "bonded pair," which together form a single zone. For example, the playback device 102f (FIG. 1A) named "Bed 1" in FIG. 3A may be bonded to the playback device 102g (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102d named "Bookcase" may be merged with the playback device 102m named "Living Room" to form a single Zone C. The merged playback devices 102d and 102m may not be specifically assigned different playback responsibilities. That is, the merged playback devices 102d and 102m may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various embodiments, a zone may take on the name of one of the playback devices belonging to the zone. For example, Zone C may take on the name of the Living Room device 102m (as shown). In another example, Zone C may instead take on the name of the Bookcase device 102d. In a further example, Zone C may take on a name that is some combination of the Bookcase device 102d and Living Room device 102m. The name that is chosen may be selected by a user via inputs at a controller device 104. In some embodiments, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102f in the master bedroom 101h (FIG. 1A) and the Bed 2 device may be the playback device 102g also in the master bedroom 101h (FIG. 1A).

As noted above, playback devices that are bonded may have different playback responsibilities, such as playback responsibilities for certain audio channels. For example, as shown in FIG. 3B, the Bed 1 and Bed 2 devices 102f and 102g may be bonded so as to produce or enhance a stereo effect of audio content. In this example, the Bed 1 playback device 102f may be configured to play a left channel audio component, while the Bed 2 playback device 102g may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102b named "Front" may be bonded with the playback device 102k named "SUB." The Front device 102b may render a range of mid to high frequencies, and the SUB device 102k may render low frequencies as, for example, a subwoofer. When unbonded, the Front device 102b may be configured to render a full range of frequencies. As another example, FIG. 3D shows the Front and SUB devices 102b and 102k further bonded with Right and Left playback devices 102a and 102j, respectively. In some implementations, the Right and Left devices 102a and 102j may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of. Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one embodiment, the playback devices 102d and 102m may playback audio in synchrony, during which each outputs the full range of audio content that each respective playback device 102d and 102m is capable of rendering.

In some embodiments, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD device 103f named "Island" may be bonded with the playback device 102i Kitchen, which together form Zone F, which is also named "Kitchen." Additional details regarding assigning NMDs and playback devices as designated or default devices may be found, for example, in previously referenced U.S. Patent Publication No. 2017-0242653. In some embodiments, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some embodiments, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the media playback system 100, which may be shared from time to time among the devices so that one or more of the devices have the most recent data associated with the system.

In some embodiments, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. Patent Publication No. 2018-0107446 published Apr. 19, 2018 and titled "Room Association Based on Name," and U.S. Pat. No. 8,483,853 filed Sep. 11, 2007, and titled "Controlling and manipulating groupings in a multi-zone media system," each of which is incorporated herein by reference in its entirety. In some embodiments, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In embodiments described below, the memory 213 is configured to store a set of command data for selecting a particular VAS when processing voice inputs.

During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone. For instance, the user may be in the Office zone where the playback device 102n is playing the same hip-hop music that is being playing by playback device 102c in the Patio zone. In such a case, playback devices 102c and 102n may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102c from the Patio zone to the Office zone, the Office zone may now include both the playback devices 102c and 102n. In some cases, the user may pair or group the moved playback device 102c with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102i and 102l may render audio content in synchrony. As another example, bonded playback devices in the Den zone may be split into (i) a television zone and (ii) a separate listening zone. The television zone may include the Front playback device 102b. The listening zone may include the Right, Left, and SUB playback devices 102a, 102j, and 102k, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103a or 103b (FIG. 1B) to control the Den zone before it is separated into the television zone and the listening zone. Once separated, the listening zone may be controlled, for example, by a user in the vicinity of the NMD 103a, and the television zone may be controlled, for example, by a user in the vicinity of the NMD 103b. As described above, however, any of the NMDs 103 may be configured to control the various playback and other devices of the MPS 100.

c. Example Controller Devices

FIG. 4A is a functional block diagram illustrating certain aspects of a selected one of the controller devices 104 of the MPS 100 of FIG. 1A. Such controller devices may also be referred to herein as a "control device" or "controller." The controller device shown in FIG. 4A may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

As shown in FIG. 4A, the controller device 104 also includes a user interface 440 that is generally configured to facilitate user access and control of the MPS 100. The user interface 440 may include a touch-screen display or other physical interface configured to provide various graphical controller interfaces, such as the controller interfaces 440a and 440b shown in FIGS. 4B and 4C. Referring to FIGS. 4B and 4C together, the controller interfaces 440a and 440b includes a playback control region 442, a playback zone region 443, a playback status region 444, a playback queue region 446, and a sources region 448. The user interface as shown is just one example of an interface that may be provided on a network device, such as the controller device shown in FIG. 4A, and accessed by users to control a media playback system, such as the MPS 100. Other user interfaces of varying formats, styles, and interactive sequences may alternatively be implemented on one or more network devices to provide comparable control access to a media playback system.

The playback control region 442 (FIG. 4B) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 442 may also include selectable icons that, when selected, modify equalization settings and/or playback volume, among other possibilities.

The playback zone region 443 (FIG. 4C) may include representations of playback zones within the MPS 100. The playback zones regions 443 may also include a representation of zone groups, such as the Dining Room+Kitchen zone group, as shown. In some embodiments, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 443 (FIG. 4C) may be dynamically updated as playback zone or zone group configurations are modified.

The playback status region 444 (FIG. 4B) may include graphical representations of audio content that is presently being played, previously played, or scheduled to play next in the selected playback zone or zone group. The selected playback zone or zone group may be visually distinguished on a controller interface, such as within the playback zone region 443 and/or the playback status region 444. The graphical representations may include track title, artist name, album name, album year, track length, and/or other relevant information that may be useful for the user to know when controlling the MPS 100 via a controller interface.

The playback queue region 446 may include graphical representations of audio content in a playback queue associated with the selected playback zone or zone group. In some embodiments, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 4B and 4C, the graphical representations of audio content in the playback queue region 446 (FIG. 4B) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 448 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some embodiments, a user may assign a VAS exclusively to one or more NMDs. For example, a user may assign a first VAS to one or both of the NMDs 102a and 102b in the Living Room shown in FIG. 1A, and a second VAS to the NMD 103f in the Kitchen. Other examples are possible.

d. Example Audio Content Sources

The audio sources in the sources region 448 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some embodiments, audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some embodiments, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 5:
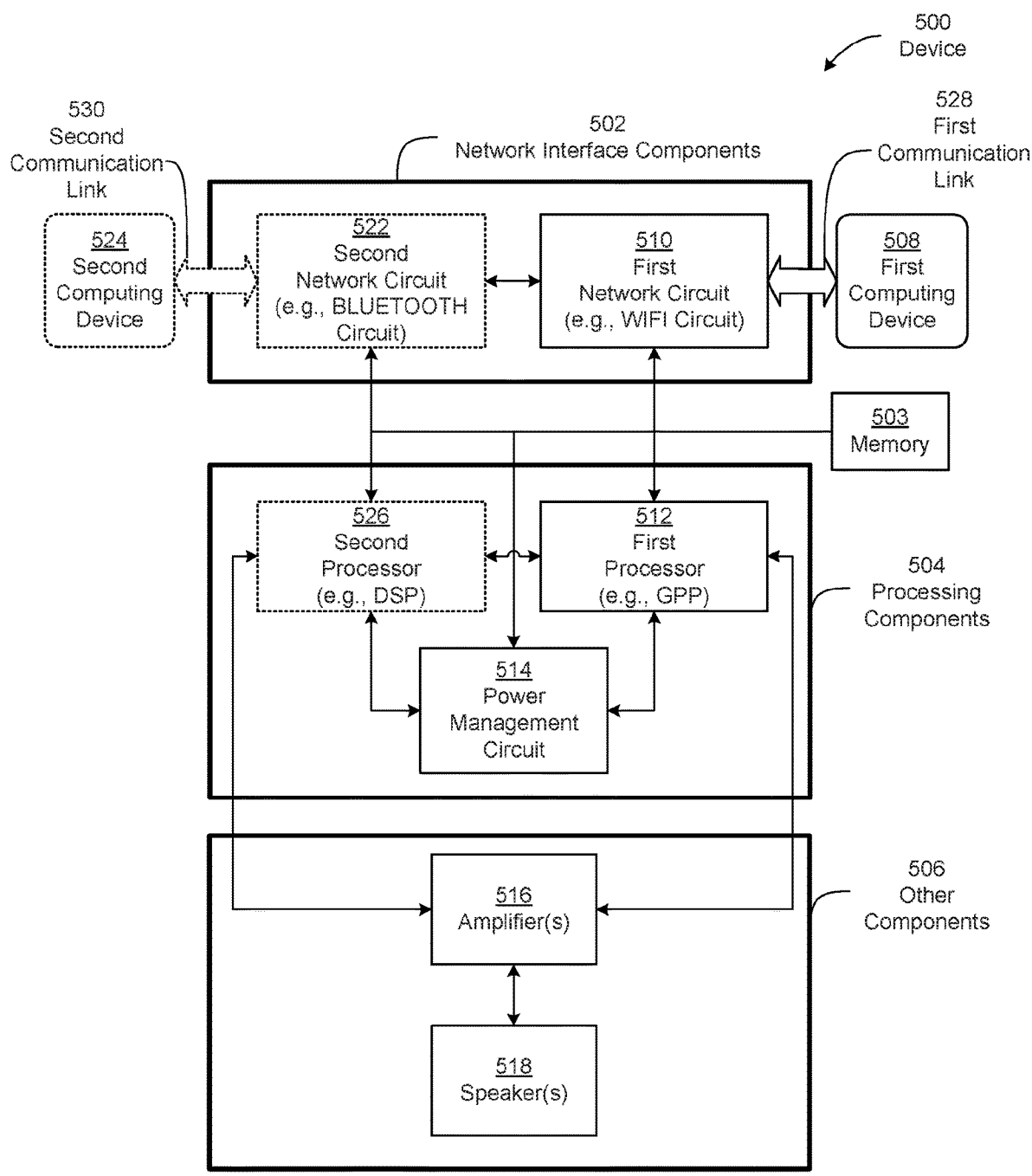
FIG. 5 is a functional block diagram of certain components of an example device employing power management techniques in accordance with aspects of the disclosure.

III. Example Power Management Techniques for Waking-Up Processors in Media Playback Systems As discussed above, certain electronic components within a device may be put to sleep when idle to reduce the power consumption of the device. For example, electronic components that are associated with specific commands (e.g., streaming music over a wireless network) may be put to sleep when receiving such a specific command from a user is unlikely (e.g., no known wireless networks are within range). Conversely, such electronic components may be woken up when receipt of the specific commands from a user is likely (e.g., a wireless network is in range). An example device that employs the power management techniques described herein is shown in FIG. 5 by device 500. The device 500 may be implemented as any of a variety of devices including any of the devices described herein (e.g., playback devices, NMDs, etc.).

As shown in FIG. 5, the device 500 comprises network interface components 502 to facilitate communication with external devices. The network interface components 502 include a first network circuit 510 to facilitate communication with a first computing device 508 over a first communication link 528 and a second network circuit 522 to facilitate communication with a second computing device 524 over a second communication link 530. The device 500 further includes processing components 504 that are coupled to the network interface components 502. The processing components include a first processor 512, a second processor 526, and a power management circuit 514 that controls power delivery to the first processor 512 and/or the second processor 526. The first processor 512 and/or the second processor 526 may execute instructions stored in a memory 503. The device 500 further includes other components 506 that perform various operations of the device. Examples of such other components 506 include amplifiers 516 and/or speakers 518. The components shown in FIG. 5 may be attached to one or more circuit boards within the device 500 to form one or more modules. These components may be distributed between the one or more circuit boards within the device 500 in any fashion.

The network interface components 502 may facilitate wireless communication to one or more external devices shown as the first computing device 508 and the second computing device 524. The network interface components 502 may comprise the first network circuit 510 that enables communication over the first communication link 528 using a first communication protocol and a second network circuit 522 that enables communication over the second communication link 530 using a second, different communication protocol. For example, the first network circuit 510 may enable communication using an IEEE 802 protocol and/or a cellular network protocol while the second network circuit 522 may enable communication using another protocol, such as a BLUETOOTH protocol. Thus, the network interface components 502 may enable communication (e.g., simultaneous communication) with multiple computing devices using different communication protocols.

In some embodiments, the first network circuit 510 may be implemented as a WI-FI circuit that is configured to communicate with the first computing device 508 over a WI-FI network. In these embodiments, the first computing device 508 may be, for example, a network router and/or a computing device that is accessible over the Internet (e.g., a cloud server). Additionally (or alternatively), the second network circuit 522 may be implemented as a BLUETOOTH circuit that is configured to communicate with the second computing device 522 using a BLUETOOTH connection. In such instances, the second computing device 524 may be, for example, a portable computing device such as a smartphone or a tablet.

The network circuits 510 and 522 may comprise one or more network processors that execute instructions stored in a memory that cause the network circuits 510 and 522 to perform various operations. For example, the network circuits 510 and 522 may each comprise a read-only memory (ROM) that stores firmware that may be executed by the one or more network processors. Additionally (or alternatively), the network circuits 510 and 522 may comprise a read-write memory (e.g., a memory that is both readable and writable) that stores instructions that may be executed by the one or more network processors. The network processors may be, for example, low-power processors such as CORTEX-M series processors by ARM (e.g., Cortex-M3 processor, Cortex M4 processor, etc.). In some embodiments, the one or more network processors may access a memory outside of the network interface components 502, such as the memory 503. In these embodiments, the memory 503 may also be accessible by the processing components 504 (e.g., the first processor 512 and/or the second processor 526). In other embodiments, the one or more network processors may not have direct access to an external memory that is shared with the processing components 504 (e.g., the one or more network processors may not have direct access to memory 503).

In some embodiments, the first network circuit 510 may be specially configured to perform operations beyond facilitating communication over a wireless network. For example, the first network circuit 510 may be configured to detect the presence of a known wireless network (e.g., a WLAN such as a WI-FI network) and provide an output signal to the processing components when a particular wireless network is detected. Thus, the task of detecting the presence of a known wireless network may be offloaded from the processing components 504 to the first network circuit 510. As a result, portions of the processing components 504 (e.g., the first processor 512) may be put to sleep until a wireless network is detected and the power consumption of the device 500 may be reduced. Example techniques that may be employed by the first network circuit 510 to detect a wireless network and provide an output signal to the processing components 504 are described in more detail below with respect to FIG. 6.

Additionally (or alternatively), the second network circuit 522 may be specially configured to perform operations beyond facilitating communication over a wireless network. In some embodiments, the second network circuit 522 may be configured to detect proximity to a known device such as another playback device (e.g., detect a wireless signal, such as a BLUETOOTH LOW ENERGY (BLE) wireless beacon, emitted by the known device). In these embodiments, the second network circuit 522 may provide an output signal to the processing components 504 when the presence of a known device is detected. Thus, the task of detecting the presence of a known device may be offloaded from the processing components 504 to the second network circuit 522. As a result, portions of the processing components 504 (e.g., the first processor 512) may be put to sleep until another playback device is detected and the power consumption of the device 500 may be reduced. For example, the device 500 may be a portable device (e.g., a portable playback device) and the second network circuit 522 may be configured to detect a wireless signal (e.g., a wireless beacon such as a BLE beacon) emitted by a stationary device (e.g., a stationary playback device) that is located in the home of a user. In this example, the second network circuit 522 may provide an output signal to the processing components 504 when the wireless signal emitted by the stationary device is detected (e.g., to indicate that the user is somewhere in or near their home). The processing components 504 may, in turn, cause the device 500 to attempt to find and/or connect to a wireless network (e.g., a user's home network). Thus, portions of the processing components 504 may be put to sleep in scenarios where the user is far away from their home (e.g., not within range of a stationary device located in their home) and intelligently woken-up when the device 500 comes within range of their home (e.g., and likely within range of the user's home wireless network).

It should be appreciated that the network interface components 502 may be implemented as one or more circuit dies integrated into one or more circuit packages. For example, the network interface components 502 may be implemented as a single circuit die integrated into a single package. In another example, the first network circuit 510 may be implemented as a first circuit die and the second network circuit 522 may be implemented as a second circuit die. In this example, the first and second circuit dies may be integrated into a single circuit package or separate circuit packages. Thus, the network interface components 502 may be implemented in any of a variety of ways.

The memory 503 may be coupled to the network interface components 502 (e.g., the first network circuit 510 and/or the second network circuit 522) and/or the processing components 504 (e.g., the first processor 512, the second processor 526, and/or the power management circuit 514). The memory 503 may be, for example, a tangible, non-transitory, computer-readable medium configured to store instructions that are executable. The memory 503 may comprise a volatile memory (e.g., a memory that only maintains data while powered) and/or non-volatile memory (e.g., a memory that maintains data even after being power cycled). The memory 503 may be, in some embodiments, a read-write memory.

The processing components 504 may be coupled to the network interface components 502 and configured to control one or more aspects of the operation of the device 500. The processing components 504 may comprise processors 512 and 526 that may each execute instructions stored in a memory, such as memory 503. In some embodiments, the first processor 512 may handle operations involving communication via the first network circuit 510 while the second processor 526 may handle operations involving communication via the second network circuit 526. Thus, the first processor 512 may advantageously be put to sleep when no operations involving communication via the first network circuit 510 are likely to occur in the near future (e.g., no wireless networks for the first network circuit 510 to connect to are in range). Similarly, the second processor 526 may be put to sleep when no operations involving communication via the second network circuit 526 are likely to occur in the near future (e.g., no wireless networks for the second network circuit 526 to connect to are in range). For example, the first processor 512 may handle operations involving the playback of music streamed from over the Internet via the first network circuit 510 while the second processor 526 may handle operations involving the playback of music streamed over a BLUETOOTH communication link via the second network circuit 522. In this example, the first processor 512 may be advantageously put to sleep in situations where music is unlikely to be streamed over the Internet (e.g., no WI-FI networks are within range). Similarly, the second processor 526 may advantageously be put to sleep in situations where music is unlikely to be streamed over BLUETOOTH (e.g., no BLUETOOTH networks are within range).

Given the different nature of the operations each of processors 512 and 526 may handle, the first processor 512 may, in some embodiments, have a different construction than the second processor 526. For example, the first processor 512 may be a general-purpose processor (GPP), such as a reduced instruction set computer (RISC) processor, while the second processor may not be a GPP, such as a digital signal processor (DSP) or other special-purpose processor (SPP). In other embodiments, the processors 512 and 526 may have the same (or similar) constructions. For example, the processors 512 and 526 may both be GPPs. In this example, the processors 512 and 526 may have the same architecture or different architectures.

The processing components 504 may further include the power management circuit 514 that controls power delivery to the first processor 512 and the second processor 526. The power management circuit 514 may comprise, for example, a set of switches that couple each of the processors 512 and 526 to a power supply (and/or a power source). The state of the set of switches may be varied based on control signals received from any of a variety of components within the device 500 such as: the first processor 512, the second processor 526, and the network interface components 502 (e.g., the first network circuit 510 and/or the second network circuit 522).

The processing components 504 may be configured to change the power state of the first processor 512 to reduce the power consumption of the device 500 in instances where the device is unlikely to receive a command that invokes the first processor 512. In some embodiments, the processing components 504 may keep the first processor 512 in a sleep state (e.g., a deep sleep or a light sleep state) while the first processor 512 is unlikely to be needed (e.g., the first network circuit 510 does not detect any known wireless networks in range). In these embodiments, the processing components 504 may wake-up the first processor 512 when an output signal is received from network interface components 502 (e.g., the first network circuit 510 and/or the second network circuit 522) indicating one or more of the following: a known wireless network is within range, another device is within range, and the device 500 is currently located within a specific area (e.g., within a user's home, proximate a user's home, within a user's workplace, proximate a user's workplace, etc.). Example techniques that may be performed by the processing components 504 to wake-up the first processor 512 and execute commands are described in greater detail below with reference to FIG. 7.

It should be appreciated that the first processor 512 and the second processor 526 may be implemented in any of a variety of ways. In some embodiments, the first processor 512 is separate and distinct from the second processor 526. For example, each of the first and second processors 512 and 526 may have their own set of one or more processor caches and/or be implemented on their own circuit dies. In other embodiments, the first processor 512 may be integrated with the second processor 526. For example, the first and second processors 512 and 526 may be implemented as a multi-core processor include a first processor core that operates as the first processor 512 and a second processor core that operates at the second processor 526. In this example, the first and second processors 512 and 526, respectively, may share one or more processor caches or have entirely separate processor caches. Still yet further, one or more of the first processor 512 and the second processor 526 may be multi-core processors.

The other components 506 may comprise any of a variety of components depending on the implementation of the device 500. In some embodiments, the device 500 may be implemented as a playback device configured to playback audio content. In these embodiments, the other components 506 may comprise various electronic components to facilitate playback of audio content such as amplifiers 516 that are configured to drive speakers 518. The speakers 518 may be external to the device 500 or integrated with the device 500. In other embodiments, the device 500 may be implemented as an NMD. In these embodiments, the other components 506 may comprise various components to detect speech such as microphones.

It should be appreciated that one or more components may be omitted from the device 500 without departing from the scope of the present disclosure. In some embodiments, the device 500 may only communicate using a single protocol (or set of protocols), such as IEEE 802 protocols, and the second network circuit 522 that enables communication with the second computing device 524 may be omitted. Additionally (or alternatively), the device 500 may only employ a single processor and the second processor 526 may be omitted.

Figure 6:
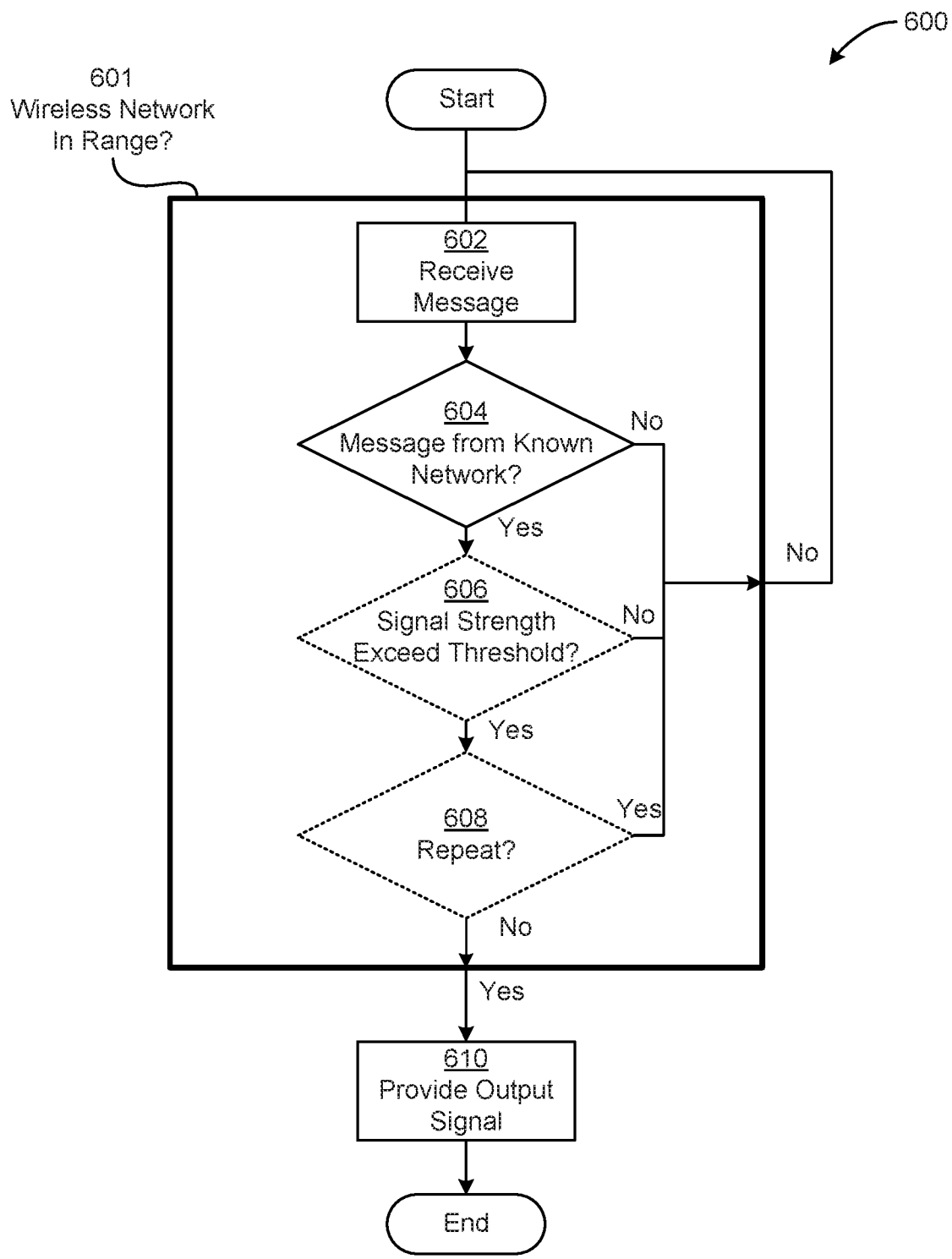
FIG. 6 is a functional flow diagram of example method of operation for the network interface components of the device in FIG. 5 in accordance with aspects of the disclosure.

FIG. 6 shows an example process 600 for operating network interface components (e.g., network interface components 502) in a device (e.g., device 500). As shown, the process 600 includes an act 601 of determining whether the wireless network is in range and an act 610 of providing an output signal. The act 601 of determining whether the wireless network is in range may include, for example, an act 602 of receiving a message, an act 604 of determining whether the message is from a known network, an act 606 of determining whether the signal strength of the received message exceeds a threshold, and an act 608 of determining whether to repeat any combination of acts 602-606.

In act 601, the network interface components may determine whether the wireless network is in range. For example, the network interface components may determine whether a wireless network is within sufficient range so as to reliably communicate over the wireless network. The network interface components may determine whether the wireless network is in range in any of a variety of ways. In some embodiments, the network interface components may determine whether the wireless network is in range consistent with one or more of acts 602, 604, 606, and 608 as described in more detail below.

In act 602, the network interface components may receive a message from a wireless network. The message may be, for example, a broadcast message that announces the existence of the wireless network to the network interface components. The message may be, for example, periodically broadcast on the wireless network (e.g., from a network router) or received in response to a request sent from the network interface components (e.g., a probe request). The message may include, for example, information that uniquely identifies the network, such as a service set identifier (SSID) in instances where the wireless network is a WI-FI network.

In act 604, the network interface components may determine whether the message received in act 602 is from a known network. The network interface components may determine whether the message is from a known network using the information identifying the network contained in the message. For example, the network interface components may access identifying information (e.g., SSIDs) associated with a set of known networks stored in memory (e.g., a memory within the network interface components or a memory external to the network interface components such as memory 503) and determine whether the identifying information in the received message (e.g., the SSID in the message) matches the identifying information stored in memory (e.g., matches a known SSID). If the network interface components determine that the identifying information in the received message matches the identifying information stored in memory, the network interface components may determine that the received message is from a known network and proceed to act 606. Conversely, if the network interface components determine that the identifying information in the received message does not match the identifying information stored in the memory, the network interface components may determine that the received message is not from a known network and restart process 600 (e.g., return to act 602 to receive another message).

In act 606, the network interface components may determine whether the message received in act 602 had a signal strength that exceeded a threshold. For example, the network interface components may calculate a received signal strength indicator (RSSI) value for the message and determine whether the RSSI value exceeds a threshold. Additionally (or alternatively), the network interface components may calculate a signal-to-noise ratio (SNR) for the message and determine whether the SNR exceeds a threshold. If the network interface components determine that the signal strength exceeds the threshold, the network interface components may determine that the wireless network is in range and proceed to act 608. Otherwise, the network interface components may determine that the wireless network is not within range restart the process 600 (e.g., return to act 602 to receive another message). Thus, the network interface components may advantageously avoid attempting to connect networks where the signal strength is too weak to support any sustained communication.

It should be appreciated that the network interface components may employ other information apart from signal strength to determine whether the wireless network is sufficiently close so as to be able to maintain a connection. In some embodiments, the network interface components may further comprise a global positioning system (GPS) circuit, such as a GPS receiver. In these embodiments, the network interface components may determine and further employ a calculated GPS location to determine whether the wireless network is within range. For example, a geofence may be associated with a particular known SSID (e.g., an SSID for a home network) and the network interface components may further determine whether the current GPS coordinate is inside the geofence associated with the SSID detected in act 604. If the network interface components determine that the current GPS coordinate is within the geofence, the network interface components may proceed to act 608. Otherwise, the network interface components may determine that the wireless network is not within range restart the process 600 (e.g., return to act 602 to receive another message). Additionally (or alternatively), a stationary device (e.g., a stationary playback device) may be positioned within a user's home and emit a wireless beacon (e.g., a BLUETOOTH beacon such as a BLE beacon) that may be employed as a proxy for the user's home network being within range. In these embodiments, the network interface components may employ the presence (or absence) of the wireless beacon emitted by the stationary device to determine whether the wireless network is within range. For example, a set of one or more stationary devices (e.g., in or near a user's home) may be associated with a particular known SSID (e.g., an SSID for a home network) and the network interface components may further determine whether a wireless beacon was detected from any of the stationary devices in the set of one or more stationary devices. If the network interface components determine that a wireless beacon from one or more of the stationary devices in the set was detected, the network interface components may proceed to act 608. Otherwise, the network interface components may determine that the wireless network is not within range restart the process 600 (e.g., return to act 602 to receive another message). Thus, the network interface components may use additional information separate and apart from signal strength to determine whether the wireless network is sufficiently close so as to be able to maintain a connection.

In act 608, the network interface components may determine whether to repeat one or more of acts 602-606. For example, the network interface components may be configured to perform acts 602-606 a minimum number of times before determining that a wireless network is in range. In this example, the network interface components may determine how many times acts 602-606 have been performed and compare the result a minimum threshold number of times. Performing acts 602-606 multiple time may advantageously avoid attempting to connect to networks that, while presently in range, while soon become out of range. For example, the device may be passing in-and-out of range with numerous wireless networks while sitting in a car driving through a dense city. In this example, the network interface components may avoid connecting to these wireless networks that are passing in-and-out of range because the network interface components are unlikely to receive multiple messages in act 602 from a single wireless network.

In act 610, the network interface components may provide an output signal indicative of the wireless network being in range. The output signal may be provided to, for example, other components of the device such as the processor components (e.g., processor components 504). Additionally (or alternatively), the network interface components may store information regarding the particular wireless network that was detected (e.g., the SSID for the detected network) in a memory location that is accessible by the processing components (e.g., memory 503).

It should be appreciated that, in some embodiments, the network interface components may omit one or more of acts from process 600. For example, the network interface components may assume that a communication link over the wireless network can be maintained when a message is received and omit act 606. Additionally (or alternatively), the network interface components may assume that the wireless network is unlikely to quickly become out of range and omit act 608.

Figure 7:
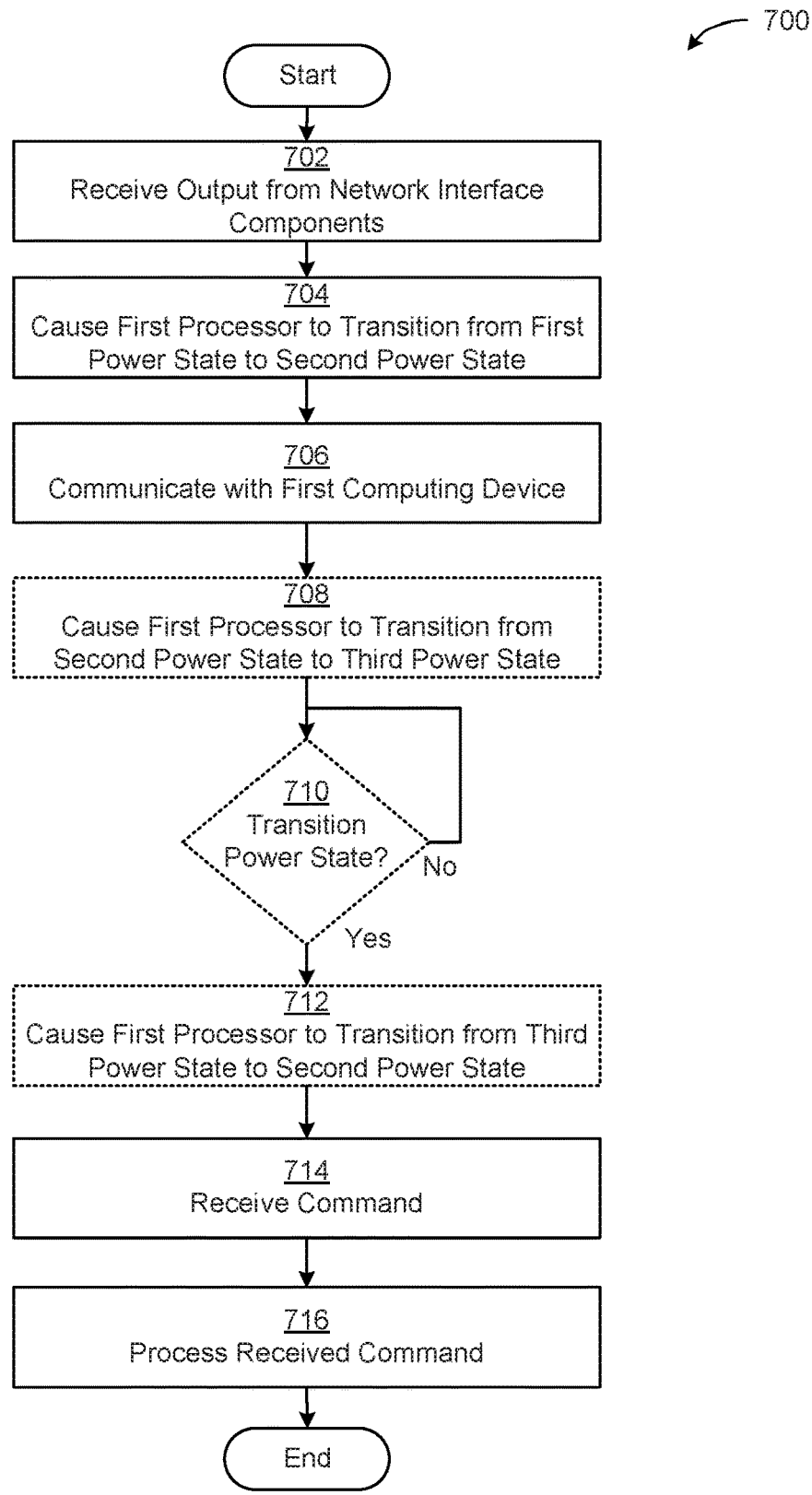
FIG. 7 is a functional flow diagram of example method of operation for the processing components of the device in FIG. 5 in accordance with aspects of the disclosure.

FIG. 7 shows an example process 700 of operating processing components (e.g., processing components 504) in a device (e.g., device 500). As shown, the process 700 comprises an act 702 of receiving an output from the network interface components, an act 704 of causing the first processor to transition from a first power state to a second power state, an act 706 of communicating with a first computing device, an act 708 of causing the first processor to transition from the second power state to a third power state, an act 710 of determining whether to transition power states, an act 712 of causing the first processor to transition from the third power state to the second power state, an act 714 of receiving a command, and an act 716 of processing the command.

In act 702, the processing components may receive an output from the network interface components. The output may be, for example, a change in voltage at one or more output terminals of the network interface. The output may be detected by any combination of elements within the processing components, such as a first processor (e.g., first processor 512), a second processor (e.g., second processor 526) and/or a power management circuit (e.g., power management circuit 514).

In act 704, the processing components may cause the first processor to transition from a first power state to a second power state. For example, the processing components may cause the first processor to transition from a sleep state (e.g., a light sleep state or deep sleep state) to an awake state. The processing components may cause the first processor to transition states in any of a variety of ways. In some embodiments, the processing components may wake-up the first processor using one or more other components, such as the power management circuit and/or the second processor. Employing another component to trigger the first processor to wake-up may advantageously enable the first processor to be awakened from states where the first processor cannot process inputs, such as a deep sleep state where the first processor is completely powered off. For example, the output signal from the network interface components may be provided to the second processor that may, in turn, send control signals to the power management circuit to begin providing power to the first processor. In another example, the output from the network interface components may be provided to the power management circuit directly that may, in turn, begin providing power to the first processor. In other embodiments, the first processor may be awakened directly by the output of the network interface components. For example, the first processor may be in a light sleep state and receipt of the output from the network interface components may trigger the first processor to change from the light sleep state to the awake state.

In act 706, the processing components may communicate with a first computing device over a wireless network, such as the wireless network detected by the network interface components in process 600. The processing components may exchange any of a variety of information with any of a variety of computing devices. In some embodiments, the processing components may communicate with the first computing device to advantageously expedite execution of one or more anticipated commands by the user. For example, the processing components may establish a communication link with a computing device that likely will need to be accessed to process a common user command, such as a network router and/or a cloud server. Thus, the processing components may be able to process a command from a user that requires communication with the first computing device with minimal perceived lag.

In some embodiments, the processing components may communicate over a WLAN (e.g., a WI-FI network) with an access point (e.g., a network router) in act 706. For example, the processing components may become authenticated with the access point (e.g., establish a connection with the access point) and/or associated with the access point (e.g., gain access to the WAN via the access point). Thus, receipt of subsequent commands from the user that require communication via the access point may be advantageously processed faster. Further, the processing components may receive packets over the WLAN that may trigger power save operations to further reduce power consumption. For example, in implementations where wake-on WLAN is supported, the processing components may receive magic packets from the access point that may trigger the processing components to transition power states of one or more processors, such as the first processor. As a result, the state of one or more processors may be controlled remotely over the wireless network for further power savings once the device is authenticated with and/or associated with the access point.

The processing components may attempt to become authenticated with an access point by transmitting an authentication request to the access point that includes information regarding the identity of the device (e.g., a MAC address) and receiving, in response to the transmitted authentication request, a response from the access point that includes an indication of whether the authentication was successful or failed. In instances where the wireless network is a secured wireless network (e.g., a WI-FI network employing WEP, WPA, and/or WPA2 encryption), the processing components may obtain one or more keys as a result of authentication for encryption and/or decryption of data. Such keys (along with any other network configuration information such as the IP address associated with the access point) may be, for example, stored in a memory of the device (e.g., memory 503) for later use to transmit and/or receive data over the wireless network.

After authentication is complete, the processing components may attempt to become associated with the access point. For example, the processing components may transmit an association request to the access point and receive, in response to the association request, a response from the access point that includes in indication of whether the association was successful. Should the association be successful, the processing components may gain access to the WAN, such as the Internet, via the access point.

It should be appreciated that the processing components may communicate with additional computing devices separate and apart from the access point in act 706. In some embodiments, the processing components may communicate with one or more cloud servers over the Internet. The processing components may communicate with the cloud servers to, for example, register the device with the cloud server to facilitate subsequent access of information from the cloud servers. For illustration, the processing components may register with a cloud server to gain access to audio content that may be streamed from the cloud server or another cloud server. In this example, the processing components may receive registration information, such as a token, as a result of successfully authentication with the cloud server that may be, in turn, used to access the audio content on the cloud server. The registration information may be stored in memory (e.g., memory 503) and subsequently used for later information. Thus, the processing components may be advantageously able to process a command from a user to stream music from the cloud server expeditiously because the device is already registered with the cloud server.

In some embodiments, the processing components may obtain player state information in act 706 that is associated with a media playback system. The media playback system may communicate over the same wireless network (e.g., on the same LAN such as the same WI-FI network) as the device. Thus, the processing components may obtain the player state information directly from the media playback system (or any component thereof such as a playback device and/or an NMD) and store the player state information in memory (e.g., memory 503). Alternatively, the processing components may obtain the player state information from a cloud server over the Internet. Examples of such player state information may include: zones where individual playback devices are located (e.g., kitchen, balcony, living room, bedroom, and so on); a list of songs recently played on a playback device; a song currently playing on a playback device; a list of songs to be played on a playback device; names given to individual playback devices; information about which playback devices have been grouped in synchrony groups, grouped into a consolidated playback device, and/or grouped into a bonded group of playback devices; information about what channel or channels of audio a particular playback device is configured to play (e.g., "left channel," or "rear left channel," among other examples); equalization settings for individual playback devices or groups of playback devices; the equalization settings for individual playback devices or groups of playback devices such as SONOS TRUEPLAY settings for individual playback devices or groups of playback devices; orientation state information for individual playback devices (e.g., whether a particular playback device is standing right side up, upside down, or on its side); networking information such as whether a particular playback device is operating as a group coordinator (e.g., a "master") in a group of playback devices or is operating as a group member (e.g., a "slave") in a group of playback devices; physical state information such as a battery level of a playback device, whether the playback device is physically attached to an electrical power outlet, whether the playback device is attached to a base, and/or whether the playback device is currently in motion (i.e., being moved).

Obtaining such player state information in act 706 may advantageously enable the processing components to perform one or more commands that require such player state information expeditiously (e.g., because such information may be retrieved directly from a memory in the device when the command is processed). For example, the processing components may receive a command to continue playback of a song last played on a playback device in the kitchen. In this example, the processing components may retrieve the player state information from memory (e.g., memory 503) and identify which song was last played on the playback device in the kitchen using the player state information. Once the song has been ascertained using the player state information, the processing components may obtain the audio content associated with the song from a cloud server.

In some embodiments, the processing components may temporarily put the first processor into a sleep state after act 706 so as to further reduce the power consumption of the processing components while awaiting receipt of a command from the user in act 714. In these embodiments, the processing components may perform acts 708, 710, and 712 as described in more detail below.

In act 708, the processing components may cause the first processor to transition from the second power state to a third power state. For example, the processing components may cause the first processor to transition from the awake state to a sleep state, such as a light sleep state or a deep sleep state. It should be appreciated that the first processor may transition to a different sleep state than the first processor transitioned from in act 704. For example, the first processor may transition from a deep sleep state to an awake state in act 704 and transition from the awake state to a light sleep state in act 710. In this example, transitioning the first processor into a light sleep state instead of a deep sleep state in act 710 may advantageously reduce the time required for the first processor to wake-up and perform a process. Thus, the lag perceived by the user between entering a command and the appropriate actions being performed may be reduced.

In act 710, the processing components may determine whether to transition the first power state of the processor from the third power state back to the second power state. The processing components may determine whether the transition the power state of the first processor based on any of a variety of stimuli. For example, the device may support wake on WLAN and receive a magic packet from the access point that the device has been authenticated and/or associated with in act 706. In this example, the processing components may receive, via the network interface, a magic packet from the access point and, in response to receiving the magic packet, cause the first processor to transition from a sleep state back to an awake state. If the processing components determines that the first processor should transition power state, the processing components proceed to act 712 and cause the first processor to transition from the third power state back to the second power state. Otherwise, the processing components may return to act 710.

In act 714, the processing components may receive a command to perform one or more operations. The processing components may receive the command from any of a variety of sources. For example, the processing components may receive the command directly from a user via a control element (e.g., a button, a switch, etc.) being activated on the device. In another example, the processing components may receive the command from another device (e.g., a mobile phone of the user, a cloud server, etc.) via the network interface components. The particular nature of the command and associated operations to be performed may depend on, for example, the particular implementation of the device. For example, the device may be implemented as a playback device and the command may be a command to play music. In another example, the device may be a network microphone device and the command may be a command to mute a microphone. Thus, the nature of the command and the associated operations to be performed by the processing components are not limited in this manner.

In act 716, the processing components may process the one or more received commands. For example, the processing components may process an audio playback command and begin streaming audio from an audio source one or more speakers and/or amplifiers. Example processes for such audio playback commands are described in greater detail below with reference to FIG. 8.

In some embodiments, the processing components may process the one or more received commands using at least some information received and stored in act 706 to expedite processing of the request. For example, the processing components may have become authenticated and/or associated with an access point in act 706 and stored network configuration information to be employed for communication over the wireless network. In this example, the processing components may retrieve the network configuration information from memory (e.g., memory 503) and use the network configuration information to communicate over the wireless network so as to process a user command. Additionally (or alternatively), the processing components may have obtained and stored registration information for accessing a cloud server (e.g., to access audio content) in act 706. Thus, the processing components may retrieve the stored registration information to expeditiously process a user command that requires accessing the cloud server, such as a command to stream music from the cloud server. In yet another example, the processing components may have obtained and stored player state information in act 706. Thus, the processing components may retrieve the stored player state information to expeditiously process a user command that requires the player state information, such as a command to continue playback of a song last played on a particular playback device.

It should be appreciated that one or more acts may be omitted from process 700 without departing from the scope of the present disclosure. For example, acts 708, 710, and 712 may be omitted and the processing components may simply keep the first processor in the second power state after act 706 while awaiting receipt of a command.

It should be appreciated that, in some embodiments, the device may be capable of streaming music from multiple different devices over multiple different communication networks. For example, the network interface components in the device may be capable of communication over a BLUETOOTH network and over WI-FI network. In this example, the network interface may be capable of streaming music directly from a mobile computing device (e.g., a smart phone, a tablet, etc.) over the BLUETOOTH network and also capable of streaming music from cloud servers over the WI-FI network. In implementations where the device is implemented as a portable playback device (e.g., a pair of headphones), transitions between playing audio received over a BLUETOOTH network and playing audio received over a WI-FI network are likely to be requested by the user shortly after a user returns home with the portable playback device (e.g., a user returns home from work with their pair of headphones). Such transitions from out-of-home use of the portable playback device and at-home use of the portable playback device may be automatically detected by the network interface components described herein by, for example, detecting the presence of a predetermined SSID (e.g., an SSID associated with the user's home, the user's place of business, etc.). Thus, the portable playback device may intelligently wake-up components (e.g., the first processor 512) and/or connect to the user's home network (e.g., in the background without any input from the user) such that a subsequent user commands to transition from playing an audio stream received via a first communication network (e.g., a BLUETOOTH network) to playing an audio stream received from a second, different communication network (e.g., a WI-FI network) can be processed expeditiously (e.g., without the user having to wait for components to wake-up and/or wait for a connection to the be established to the network).

Figure 8:
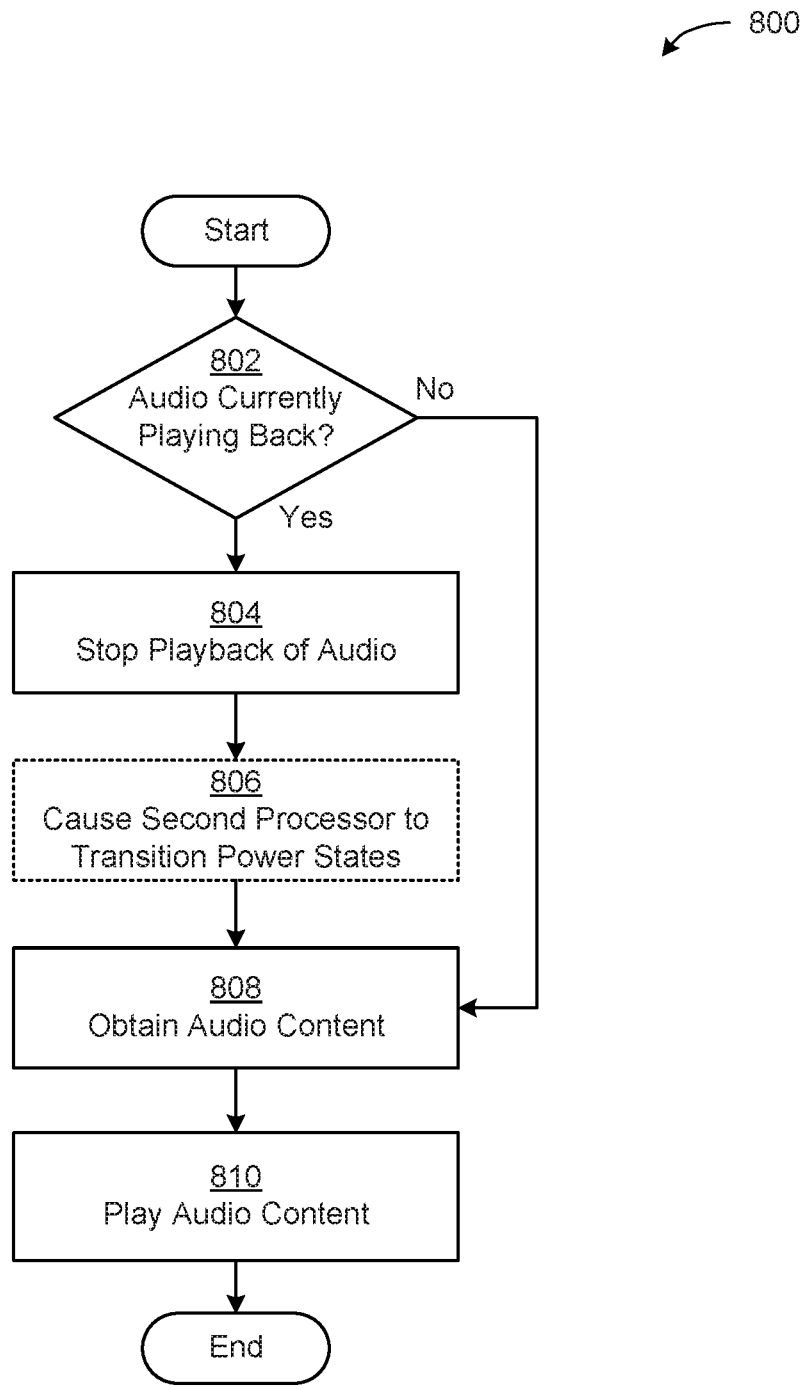
FIG. 8 is a functional flow diagram of example method of playing back audio content using a playback device in accordance with aspects of the disclosure.

An example process 800 that may be performed by a device (e.g., processor components in a device) to transition from playing audio received over a first communication network to playing audio received over a second communication network (e.g., after receipt of a command to make such a transition) is shown in FIG. 8. Process 800 may be performed as part of act 716 described above in process 700 after, for example, receiving a command to stream music from a cloud server (e.g., in act 714 of receiving a command described above in process 700). As shown, the process 800 includes an act 802 of determining whether audio is currently playing back, an act 804 of stopping playback of audio content, an act 806 of causing the second processor to transition power states, an act 808 of obtaining the audio content, and an act 810 of playing the audio content.

In act 802, the device may determine whether audio is currently being played back. For example, the device may determine whether audio content is currently being provided to one or more amplifiers and/or speakers. The source of such audio content may be, for example, a smart phone or a tablet streaming audio content via BLUETOOTH to the device. If the device determines that audio is currently being played back, the device may proceed to act 804 to stop playback of the audio. Otherwise, the device may proceed to act 808 and obtain the audio content for playback.

In act 804, the device may stop playback of the audio. The device may stop playback of the audio by, for example, stop providing an audio signal to one or more amplifiers and/or speakers in the device. In some embodiments, the device may terminate the connection to the computing device providing the audio content. For example, the audio may be streaming from a smartphone or tablet via BLUETOOTH and the device may terminate the BLUETOOTH connection to the smartphone or tablet. In other embodiments, the device may maintain the connection to the computing device providing the audio. For example, the audio may be streaming from a smartphone or tablet via BLUETOOTH and the device may maintain the BLUETOOTH connection to enable receipt of one or more playback control commands (e.g., change volume, change track, pause playback, etc.) directly from the smartphone or tablet.

In some embodiments, the device may distribute operations between multiple processors. For example, a first processor (e.g., first processor 512) may handle operations involving wireless communication over WI-FI and a second processor (e.g., the second processor 526) may handle operations involving communication over BLUETOOTH. In this example, the second processor may become idle when playback of audio received via BLUETOOTH is ceased. Accordingly, in some embodiments, the device may perform act 806 and transition the second processor from an awake state to a sleep state. It should be appreciated that act 806 is optional and the device may, instead, maintain the second processor in an awake state.

In act 808, the device may obtain the audio content. The device may, for example, obtain the audio content from one or more cloud servers (e.g., using the first processor). In some embodiments, the device may retrieve previously stored information from memory to expedite acquisition of the audio content. For example, the device may have previously registered with the server and stored registration information. In this example, the device may retrieve the registration information from memory and use the registration information to obtain the audio content from the server.

It should be appreciated that the device may be able to obtain the audio content expeditiously to advantageously reduce the delay between receipt of a user command (e.g., streaming audio over the Internet) after transitioning from a situation where no known WLAN network is available (e.g., the device is being used away from the user's home) to a situation where a known WLAN network is available (e.g., the device is being used in the user's home). For example, one or more of the following tasks have already been performed once a known SSID is detected before receipt of the user command: (1) the components used to communicate with the cloud server (e.g., the first processor) have already been awakened (e.g., in act 704 of process 700), (2) the device has already communicated with the access point associated with the user's home to network configuration information (e.g., in act 706 of process 700); and/or the device has already communicated with the cloud server associated with the music streaming service to obtain registration information (e.g., in act 706 of process 700). Thus, the device may save a considerable amount of power by keeping the first processor in a sleep state while the device is away from known WLAN networks while still providing the user a snappy experience where commands are processed nearly instantly when the device is brought within range of a known WLAN network.

In act 810, the device may play the audio content. For example, the device may provide audio signals, based on the received audio content, to one or more amplifiers and/or speakers.

Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Further, the examples described herein may be employed in systems separate and apart from media playback systems such as any Internet of Things (IoT) system comprising an IoT device. An IoT device may be, for example, a device designed to perform one or more specific tasks (e.g., making coffee, reheating food, locking a door, providing power to another device, playing music) based on information received via a network (e.g., a WAN such as the Internet). Example IoT devices include a smart thermostat, a smart doorbell, a smart lock (e.g., a smart door lock), a smart outlet, a smart light, a smart vacuum, a smart camera, a smart television, a smart kitchen appliance (e.g., a smart oven, a smart coffee maker, a smart microwave, and a smart refrigerator), a smart home fixture (e.g., a smart faucet, a smart showerhead, smart blinds, and a smart toilet), and a smart speaker (including the network accessible and/or voice-enabled playback devices described above). These IoT systems may also comprise one or more devices that communicate with the IoT device via one or more networks such as one or more cloud servers (e.g., that communicate with the IoT device over a WAN) and/or one or more computing devices (e.g., that communicate with the IoT device over a LAN and/or a PAN). Thus, the examples described herein are not limited to media playback systems.

In addition to the examples described herein with respect to stationary playback devices, embodiments of the present technology can be applied to headphones such as over-ear headsets, on-ear headsets, and in-ear headsets. For example, such headphones can include noise-cancellation functionality to reduce the user's perception of outside noise during playback. In some embodiments, noise classification can be used to modulate noise cancellation under certain conditions. For example, if a user is listening to music with noise-cancelling headphones, the noise cancellation feature may be temporarily disabled or down-regulated when a user's doorbell rings. Alternatively or additionally, the playback volume may be adjusted based on detection of the doorbell chime. By detecting the sound of the doorbell (e.g., by correctly classifying the doorbell based on received sound metadata), the noise cancellation functionality can be modified so that the user is able to hear the doorbell even while wearing noise-cancelling headphones. Various other approaches can be used to modulate performance parameters of headphones or other such devices.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

Example Features (Feature 1) A playback device comprising: one or more network interface components for communicating over a wireless network using a first communication protocol, wherein the network interface components comprise a network circuit configured to (a) determine whether the wireless network is within range of the playback device and (b) output a signal responsive to determining that the wireless network is within range; one or more amplifiers configured to drive one or more speakers; and one or more processing components comprising a first processor having a plurality of power states including a first power state and a second power state, wherein the first processor consumes more power in the second power state than in the first power state, wherein the one or more processing components are configured to perform operations comprising: detecting the output signal from the one or more network interface components; responsive to detecting of the output signal from the one or more network interface components, causing the first processor to transition from the first power state to the second power state; and after the transitioning, (a) communicating over the wireless network with a first computing device via the one or more network interface components using the first processor, (b) receiving a first command, and (c) based on the first command, (i) obtaining over the wireless network first audio content via the one or more network interface components using the first processor and (ii) playing, via the one or more amplifiers and the one or more speakers, the first audio content.

(Feature 2) The playback device of feature 1, wherein communicating with the first computing device comprises: obtaining, via the wireless network, information from the first computing device using the first processor; and storing the information from the first computing device in a memory.

(Feature 3) The playback device of feature 2, wherein the first computing device comprises a network router, wherein the information from the first computing device comprises network configuration information, and wherein obtaining the first audio content using the first processor comprises communicating over the wireless network using the network configuration information.

(Feature 4) The playback device of feature 2, wherein the information from the first computing device comprises registration information associated with at least one server.

(Feature 5) The playback device of feature 4, wherein obtaining, via the wireless network, the first audio content using the first processor comprises: retrieving the registration information from the memory using the first processor; and communicating with the at least one server using the registration information and the first processor.

(Feature 6) The playback device of any of features 1-5, wherein the one or more processing components is further configured to perform: after communicating with the first computing device, (a) transitioning the first processor from the second power state to a third power state that is different from the second power state, (b) receiving, via the wireless network, a second command, and (c) responsive to receiving the second command, causing the first processor to transition from the third power state to the second power state.

(Feature 7) The playback device of feature 6, wherein the first power state is the same as the third power state.

(Feature 8) The playback device of feature 6, wherein the first processor consumes more power in the third power state than in the first power state and wherein the first processor consumes less power in the third power state than in the second power state.

(Feature 9) The playback device of any of features 1-8, wherein the wireless network comprises a wireless local area network (WLAN).

(Feature 10) The playback device of feature 9, wherein determining whether the wireless network is within range comprises: receiving a message; and determining whether the wireless network is in range based on the message.

(Feature 11) The playback device of feature 10, wherein determining whether the wireless network is in range based on the message comprises: determining a received signal strength indicator (RSSI) value associated with the message; and determining whether the wireless network is in range based on the RSSI value associated with the message.

(Feature 12) The playback device of feature 11, wherein the message comprises a service set identifier (SSID) and wherein determining whether the wireless network is in range comprises: determining whether the wireless network is in range based on the SSID in the message.

(Feature 13) The playback device of any of features 1-12, wherein the one or more processing components comprises a second processor that has a different construction than the first processor.

(Feature 14) The playback device of feature 13, wherein detecting the output of the one or more network interface components comprises detecting the output from the one or more network interface components using the second processor.

(Feature 15) The playback device of features 13 or 14, wherein causing the first processor to transition from the first power state to the second power state comprises causing the first processor to transition from the first power state to the second power state using the second processor.

(Feature 16) The playback device of any of features 13-15, wherein the first processor is a general-purpose processor and the second processor is not a general-purpose processor.

(Feature 17) The playback device of feature 16, wherein the first processor is a reduced instruction set computer (RISC) processor and the second processor is a digital signal processor (DSP).

(Feature 18) The playback device of any of features 13-17, wherein the first processor is a first processor core, wherein the second processor is a second processor core, and wherein the one or more processing components comprises a multi-core processor that includes the first processor core and the second processor core.

(Feature 19) The playback device of any of features 1-18, wherein the one or more network interface components is further configured to wirelessly communicate with a second computing device using a second communication protocol.

(Feature 20) The playback device of feature 19, wherein the first protocol is an IEEE 802 protocol and wherein the second protocol is a BLUETOOTH protocol.

(Feature 21) The playback device of features 19 or 20, wherein the one or more processing components are further configured to perform: receiving second audio content from the second computing device; and playing, via the one or more amplifiers and the one or more speakers, the second audio content.

(Feature 22) The playback device of feature 21, wherein receiving the first command comprises receiving the first command while playing the second audio content and wherein the one or more processing components are further configured to perform: responsive to receiving the first command, stopping playback of the second audio content.

(Feature 23) The playback device of features 19 or 20, wherein receiving the first command comprises receiving the first command from the second computing device.

(Feature 24) The playback device of any of features 1-23, further comprising a button coupled to the one or more processing components and wherein receiving the first command comprises detecting activation of the button.

(Feature 25) The playback device of any of feature 1-23, wherein receiving the first command comprises receiving the first command via the wireless network.

(Feature 26) The playback device of any of feature 1-25, wherein the playback device is constructed as a headphone.

(Feature 27) The playback device of feature 26, wherein the headphone is an on-ear headset, an over-ear headset, or an in-ear headset.

(Feature 28) The playback device of any of features 1-27, wherein the one or more network interface components are integrated into one or more first circuit dies and the one or more processing components are integrated into one or more second circuit dies that are separate and distinct from the one or more first circuit dies.

(Feature 29) A method of operating a playback device comprising one or more network interface components configured to communicate over a wireless network and one or more processing components including a first processor, the method comprising: using the one or more network interface components to perform: determining whether the wireless network is within range; and responsive to determining that the wireless network is within range, providing an output signal to the one or more processing components; and using the one or more processing components to perform: detecting the output signal from the one or more network interface components; responsive to detecting of the output signal from the one or more network interface components, causing the processor to transition from the first power state to the second power state; and after the transitioning, (a) communicating over the wireless network with a first computing device via the one or more network interface components using the first processor, (b) receiving a first command, and (c) based on the first command, (i) obtaining over the wireless network first audio content via the one or more network interface components using the first processor and (ii) playing, via the one or more amplifiers and the one or more speakers, the first audio content using the one or more processing components.

(Feature 30) A network interface component comprising: a first terminal configured to couple to one or more antennas; a second terminal configured to couple to one or more processing components including a first processor; and a first network circuit coupled to the first and second terminals and being configured to communicate over a wireless network using a first communication protocol, the first network circuit comprising: one or more network processors; and a tangible, non-transitory, computer-readable medium storing instructions executable by the one or more network processors to cause the first network circuit to perform operations comprising: determining whether the wireless network is within range; and responsive to determining that the wireless network is within range, providing, via the second terminal, an output signal to the one or more processing components; wherein the output signal is configured to cause the one or more processing components to perform: transitioning the first processor from a first power state to a second power state where the first processor consumes more power than in the first power state; and after the transitioning, (a) communicating over the wireless network with a first computing device via the first network circuit using the first processor, (b) receiving a first command, and (c) based on the first command, (i) obtaining over the wireless network first audio content via the one or more network interface components using the first processor and (ii) playing, via the one or more amplifiers and the one or more speakers, the first audio content.

(Feature 31) The network interface component of feature 30, wherein the wireless network comprises a wireless local area network (WLAN).

(Feature 32) The network interface component of feature 31, wherein determining whether the wireless network is within range comprises: receiving a message; and determining whether the wireless network is in range based on the message.

(Feature 33) The network interface component of feature 32, wherein determining whether the wireless network is in range based on the message comprises: determining a received signal strength indicator (RSSI) value associated with the message; and determining whether the wireless network is in range based on the RSSI value associated with the message.

(Feature 34) The network interface component of feature 32, wherein the message comprises a service set identifier (SSID) and wherein determining whether the wireless network is in range comprises: determining whether the wireless network is in range based on the SSID in the message.

(Feature 35) The network interface component of feature 31, wherein communicating with the first computing device comprises: obtaining, via the wireless network, information from the first computing device using the first processor; and storing the information from the first computing device in a memory.

(Feature 36) The network interface component of feature 35, wherein the first computing device comprises a network router and wherein the information from the first computing device comprises network configuration information.

(Feature 37) The network interface components of feature 35, wherein the information from the first computing device comprises registration information associated with at least one server.

(Feature 38) The network interface component of any of features 30-37, further comprising a second network circuit configured to wirelessly communicate using a second communication protocol that is different from the first communication protocol.

(Feature 39) The network interface component of feature 38, wherein the first protocol is an IEEE 802 protocol and wherein the second protocol is a BLUETOOTH protocol.

(Feature 40) A network interface component comprising: a terminal configured to couple to one or more processing components including a processor; and a network circuit coupled to the terminal and being configured to communicate over a wireless network using a communication protocol, the network circuit comprising: one or more network processors; and a tangible, non-transitory, computer-readable medium storing instructions executable by the one or more network processors to cause the network circuit to perform operations comprising: determining whether the wireless network is within range; and based on a determination that the wireless network is within range, providing, via the terminal, an output signal to the one or more processing components; wherein the output signal is configured to cause the one or more processing components to perform: transitioning the processor from a first power state to a second power state where the processor consumes more power than in the first power state; and communicating, via the wireless network, with a computing device using the processor.

(Feature 41) The network interface component of feature 40, wherein communicating with the computing device comprises: obtaining registration information associated with a remote server from the computing device via the one or more network components using the processor; and storing the registration information from the computing device in a memory.

(Feature 42) The network interface component of feature 41, wherein obtaining over the wireless network audio content via the one or more network interface components comprises: retrieving the registration information from the memory using the processor; and based on the registration information, communicating with the remote server over the wireless network via the network interface components using the processor.

(Feature 43) The network interface component of feature 40, wherein determining whether the wireless network is within range comprises: receiving a message comprising a service set identifier (SSID); and determining whether the wireless network is in range based on the message, wherein determining whether the wireless network is in range comprises determining whether the wireless network is in range based at least on the SSID in the message.

(Feature 44) The network interface component of feature 43, wherein determining whether the wireless network is in range based on the message further comprises: determining a received signal strength indicator (RSSI) value associated with the message; and determining whether the wireless network is in range further based on the RSSI value associated with the message.

(Feature 45) A module for a device, the module comprising: a circuit board; one or more network interface components attached to the circuit board for communicating over a wireless network using a first communication protocol, wherein the network interface components comprise a network circuit configured to (a) determine whether the wireless network is within range of the device and (b) output a signal based on a determination that the wireless network is within range; and one or more processing components attached to the circuit board, wherein the one or more processing components comprise a first processor having a plurality of power states including a first power state and a second power state, wherein the first processor consumes more power in the second power state than in the first power state, wherein the one or more processing components are configured to perform operations comprising: detecting the output signal from the one or more network interface components; based on detection of the output signal from the one or more network interface components, causing the first processor to transition from the first power state to the second power state; and after the transitioning, (a) communicating over the wireless network with a first computing device via the one or more network interface components using the first processor, (b) receiving a first command, and (c) based on the first command, obtaining over the wireless network first audio content via the one or more network interface components using the first processor.

(Feature 46) The module of feature 45, further comprises a memory attached to the circuit board, wherein the memory stores instructions that are executable by the first processor that cause the device to perform one or more of the acts of: (a) communicating over the wireless network with a first computing device via the one or more network interface components using the first processor, (b) receiving a first command, and (c) based on the first command, obtaining over the wireless network first audio content via the one or more network interface components using the first processor.

(Feature 47) A playback device comprising: one or more network interface components for communicating over a first wireless network using a first communication protocol and communicating over a second wireless network using a second communication protocol, wherein the network interface components comprise a network circuit configured to (a) determine whether the second wireless network is within range of the playback device and (b) output a signal based on a determination that the first wireless network is within range; one or more amplifiers configured to drive one or more speakers; and one or more processing components comprising a first processor and a second processor, wherein the second processor has a plurality of power states include a first power state and a second power state where the second processor consumes more power than in the first power state, wherein the one or more processing components are configured to perform operations comprising: receiving first audio content from a first computing device via the first wireless network; playing, via the one or more amplifiers and the one or more speakers, the first audio content using the first processor; detecting the output signal from the one or more network interface components; based on detection of the output signal from the one or more network interface components, causing the second processor to transition from the first power state to the second power state; and after the transitioning, (a) communicating over the second wireless network with a second computing device via the one or more network interface components using the first processor, (b) receiving a first command, and (c) based on the first command, (i) obtaining over the wireless network first audio content via the one or more network interface components using the first processor and (ii) playing, via the one or more amplifiers and the one or more speakers, the first audio content.

(Feature 48) The playback device of feature 47, wherein the first protocol is an IEEE 802 protocol and wherein the second protocol is a BLUETOOTH protocol.

(Feature 49) The playback device of any of features 47 and 48, wherein receiving the first command comprises receiving the first command while playing the second audio content.

(Feature 50) The playback device of any of features 47-49, wherein the one or more processing components are further configured to perform: based on receipt of the first command, stopping playback of the second audio content.

(Feature 51) The playback device of any of features 47-50, wherein receiving the first command comprises receiving the first command from the second computing device.

(Feature 52) The playback device of any of features 47-51, wherein the one or more network interface components are integrated into one or more first circuit dies and the one or more processing components are integrated into one or more second circuit dies that are separate and distinct from the one or more first circuit dies.

(Feature 53) A playback device comprising: one or more network interface components for communicating over a wireless network, wherein the network interface components comprise a network circuit configured to (a) determine whether the wireless network is within range of the playback device and (b) output a signal responsive to determining that the wireless network is within range; one or more amplifiers configured to drive one or more speakers; and one or more processing components comprising a processor having a plurality of power states including a first power state and a second power state, wherein the processor consumes more power in the second power state than in the first power state, wherein the one or more processing components are configured to perform operations comprising: detecting the output signal from the one or more network interface components; responsive to detecting of the output signal from the one or more network interface components, causing the processor to transition from the first power state to the second power state; and after the transitioning, (a) communicating over the wireless network with a computing device via the one or more network interface components using the processor, (b) receiving a command, and (c) based on the command, (i) obtaining over the wireless network audio content via the one or more network interface components using the processor and (ii) playing, via the one or more amplifiers and the one or more speakers, the audio content.

(Feature 54) The playback device of feature 53, wherein communicating with the computing device comprises: obtaining registration information associated with a remote server from the computing device via the one or more network components using the processor; and storing the registration information from the computing device in a memory.

(Feature 55) The playback device of feature 54, wherein obtaining over the wireless network audio content via the one or more network interface components comprises: retrieving the registration information from the memory using the processor; and based on the registration information, communicating with the remote server over the wireless network via the network interface components using the processor.

(Feature 56) The playback device of feature 53, wherein the command is a first command, and wherein the operations performed by the one or more processing components further comprise: after communicating with the computing device, (a) transitioning the processor from the second power state to a third power state that is different from the second power state, (b) receiving, via the wireless network, a second command, and (c) responsive to receiving the second command, causing the processor to transition from the third power state to the second power state.

(Feature 57) The playback device of feature 53, wherein determining whether the wireless network is within range comprises: receiving a message comprising a service set identifier (SSID); and determining whether the wireless network is in range based on the message, wherein determining whether the wireless network is in range comprises determining whether the wireless network is in range based at least on the SSID in the message.

(Feature 58) The playback device of feature 57, wherein determining whether the wireless network is in range based on the message further comprises: determining a received signal strength indicator (RSSI) value associated with the message; and determining whether the wireless network is in range further based on the RSSI value associated with the message.

(Feature 59) The playback device of feature 53, wherein the wireless network comprises a wireless local area network (WLAN).

(Feature 60) The playback device of feature 53, wherein the playback device is constructed as a headphone.

(Feature 61) The playback device of feature 60, wherein the headphone is an on-ear headset, an over-ear headset, or an in-ear headset.

(Feature 62) A method of operating a playback device comprising one or more network interface components configured to communicate over a wireless network and one or more processing components including a processor, the method comprising: using the one or more network interface components to perform: determining whether the wireless network is within range; and responsive to determining that the wireless network is within range, providing an output signal to the one or more processing components; and using the one or more processing components to perform: detecting the output signal from the one or more network interface components; responsive to detecting of the output signal from the one or more network interface components, causing the processor to transition from the first power state to the second power state; and after the transitioning, (a) communicating over the wireless network with a computing device via the one or more network interface components using the processor, (b) receiving a command, and (c) based on the command, (i) obtaining over the wireless network audio content via the one or more network interface components using the processor and (ii) playing, via the one or more amplifiers and the one or more speakers, the audio content.

(Feature 63) The method of feature 62, wherein communicating with the computing device comprises: obtaining registration information associated with a remote server from the computing device via the one or more network components using the processor; and storing the registration information from the computing device in a memory.

(Feature 64) The method of feature 63, wherein obtaining over the wireless network audio content via the one or more network interface components comprises: retrieving the registration information from the memory using the processor; and based on the registration information, communicating with the remote server over the wireless network via the network interface components using the processor.

(Feature 65) The method of feature 62, wherein the command is a first command, and wherein the operations performed by the one or more processing components further comprise: after communicating with the computing device, (a) transitioning the processor from the second power state to a third power state that is different from the second power state, (b) receiving, via the wireless network, a second command, and (c) responsive to receiving the second command, causing the processor to transition from the third power state to the second power state.

(Feature 66) The method of feature 62, wherein determining whether the wireless network is within range comprises: receiving a message comprising a service set identifier (SSID); and determining whether the wireless network is in range based on the message, wherein determining whether the wireless network is in range comprises determining whether the wireless network is in range based at least on the SSID in the message.

(Feature 67) The method of feature 66, wherein determining whether the wireless network is in range based on the message further comprises: determining a received signal strength indicator (RSSI) value associated with the message; and determining whether the wireless network is in range further based on the RSSI value associated with the message.

(Feature 68) A method of operating a playback device comprising one or more network interface components configured to communicate over a wireless network and one or more processing components including a processor, the method comprising: determining, by the one or more network interface components, whether the wireless network is within range; and responsive to determining that the wireless network is within range, providing, by the one or more network interface components, an output signal to the one or more processing components; detecting, by the one or more processing components, the output signal from the one or more network interface components; responsive to detecting the output signal from the one or more network interface components, causing, by the one or more processing components, the processor to transition from the first power state to the second power state; and after the processor has transitioned to the second power state: communicating over the wireless network with a computing device via the one or more network interface components using the processor; receiving a command; and based on the received command: obtaining, over the wireless network, audio content via the one or more network interface components using the processor and playing, via one or more amplifiers and one or more speakers of the playback device, the audio content.

(Feature 69) The method of feature 68, wherein communicating with the computing device comprises: obtaining registration information associated with a remote server from the computing device via the one or more network components using the processor; and storing the registration information from the computing device in a memory.

(Feature 70) The method of feature 69, wherein obtaining audio content over the wireless network audio via the one or more network interface components comprises: retrieving the registration information from the memory using the processor; and based on the registration information, communicating with the remote server over the wireless network via the network interface components using the processor.

(Feature 71) The method of any of features 68-70, wherein the computing device comprises a network router, the method further comprising: receiving information from the computing device comprising network configuration information, and communicating over the wireless network using the network configuration information to obtain the first audio content.

(Feature 72) The method of any of features 68-71, further comprising, after communicating with the computing device: causing, by the one or more processing components, the processor to transition to one of the first power state and a third power state, receiving, via the wireless network, a second command, and responsive to receiving the second command, causing, by the one or more processing components, the processor to transition to the second power state.

(Feature 73) The method of feature 72, wherein the processor consumes less power in the third power state than in the second power state, and consumes more power in the third power state than in the first power state.

(Feature 74) The method of any of features 68-73, further comprising: receiving a message comprising a service set identifier (SSID), wherein determining whether the wireless network is in range is based at least on the SSID in the message.

(Feature 75) The method of feature 74, further comprising: determining a received signal strength indicator (RSSI) value associated with the message, wherein determining whether the wireless network is in range is further based on the RSSI value associated with the message.

(Feature 76) The method of any of features 68-75, wherein the network circuit is a first network circuit, wherein the wireless network is a first wireless network, and wherein the one or more network interface components comprise a second network circuit that is configured to communicate over a second wireless network.

(Feature 77) The method of feature 76, wherein the first and second network circuits are configured to communicate with the first and second wireless networks, respectively, using first and second network protocols, respectively, (Feature 78) The method of feature 77, wherein the first and second network protocols are IEEE 802 and BLUETOOTH, respectively.

(Feature 79) The method of one of features 76 to 78, wherein the first wireless network is a wireless local area network (WLAN).

(Feature 80) The method of one of features 76 to 79, wherein the audio content is first audio content, and wherein the method further comprises: receiving second audio content via the second wireless network; and playing, via the one or more amplifiers and the one or more speakers of the playback device, the second audio content.

(Feature 81) The method of feature 80, wherein: receiving the command comprises receiving the first command while playing the second audio content, and the one or more processing components are further configured to perform: based on receipt of the first command, stopping playback of the second audio content.

(Feature 82) The method of feature 80 or 81, wherein the command is received from the second computing device.

(Feature 83) The method of one of features 80 to 82, wherein the first command is received when a button coupled to the one or more processing components is activated by a user.

(Feature 84) The method of any of features 68-83, wherein: the processor is a first processor, and the step of causing, by the one or more processing components, the processor to transition from the first power state to the second power state comprises a second processor causing the first processor to transition from the first power state to the second power state.

(Feature 85) The method of feature 84, wherein the first processor is a general-purpose processor and the second processor is not a general-purpose processor.

(Feature 86) The method of feature 84 or 85, wherein the first processor is a reduced instruction set computer (RISC) processor and the second processor is a digital signal processor (DSP).

(Feature 87) The method of one of features 84 to 86, wherein the first and second processors are comprised by a multi-core processor.

(Feature 88) The method of one of features 84 to 87 in combination with feature 76, wherein the first and second processors are configured to handle operations involved in the playback of audio streamed via the first and second network circuits using the first and second network protocols, respectively.

(Feature 89) The method of one of features 84 to 88, further comprising causing, when no Bluetooth network is detected or when playback of audio received via the second network circuit has ceased, the second processor to transition from a first power state into a second power state, wherein the second processor consumes less power in the second power state than in the first power state.

(Feature 90) Tangible, non-transitory, computer-readable medium having instructions stored thereon which cause the one or more network processors to perform the method of any preceding feature.

(Feature 91) A playback device comprising: one or more network interface components; one or more amplifiers configured to drive one or more speakers; and one or more processing components configured to perform the operations of one of features 68 to 89.

The invention claimed is:

1. A playback device comprising:
one or more amplifiers configured to drive one or more speakers;
one or more network interface components for communicating over a wireless network, wherein the network interface components comprise a network circuit configured to:
determine whether the wireless network is within range of the playback device; and
output a signal responsive to determining that the wireless network is within range;
at least one non-transitory computer-readable medium;
one or more processing components comprising a processor having a plurality of power states including a first power state, a second power state, and a third power state, wherein the processor consumes more power in the second power state than in the first power state; and
program instructions stored on the at least one non-transitory computer-readable medium that are executable by the one or more processing components such that the playback device is configured to:
detect, by the one or more processing components, the output signal from the one or more network interface components;
responsive to detecting of the output signal from the one or more network interface components:
cause the processor to transition from the first power state to the second power state;
after causing the processor to transition from the first power state to the second power state, communicate with a computing device over the wireless network; and
after communicating with the computing device over the wireless network, cause the processor to transition from the second power state to the third power state;
while the processor is in the third power state, (a) receive, via the wireless network, a first command, and (b) based on the first command, cause the processor to transition from the third power state to the second power state; and
while the processor is in the second power state, (a) receive a second command, and (b) based on the second command, (i) obtain, over the wireless network, audio content via the one or more network interface components using the processor and (ii) play, via the one or more amplifiers and the one or more speakers, the audio content.

2. The playback device of claim 1, wherein the program instructions that are executable by the one or more processing components such that the playback device is configured to communicate with the computing device comprise program instructions that are executable by the one or more processing components such that the playback device is configured to:
obtain registration information associated with a remote server from the computing device via the one or more network interface components using the processor; and
store the registration information from the computing device in a memory.

3. The playback device of claim 2, wherein the program instructions that are executable by the one or more processing components such that the playback device is configured to obtain, over the wireless network, the audio content via the one or more network interface components comprise program instructions that are executable by the one or more processing components such that the playback device is configured to:
retrieve the registration information from the memory using the processor; and
based on the registration information, communicate with the remote server over the wireless network via the network interface components using the processor.

4. The playback device of claim 1, wherein the program instructions that are executable by the one or more processing components such that the playback device is configured to determine whether the wireless network is within range comprise program instructions that are executable by the one or more processing components such that the playback device is configured to:
receive a message comprising a service set identifier (SSID); and
determine whether the wireless network is in range based on the message, wherein determining whether the wireless network is in range comprises determining whether the wireless network is in range based at least on the SSID in the message.

5. The playback device of claim 4, wherein the program instructions that are executable by the one or more processing components such that the playback device is configured to determine whether the wireless network is in range based on the message further comprise program instructions that are executable by the one or more processing components such that the playback device is configured to:
 determine a received signal strength indicator (RSSI) value associated with the message; and
 determine whether the wireless network is in range further based on the RSSI value associated with the message.

6. The playback device of claim 1, wherein the wireless network comprises a wireless local area network (WLAN).

7. The playback device of claim 1, wherein the playback device is constructed as a headphone.

8. The playback device of claim 7, wherein the headphone is an on-ear headset, an over-ear headset, or an in-ear headset.

9. The playback device of claim 1, wherein the first power state is a deep sleep state and the third power state is a light sleep state, and wherein the processor in the third power state consumes more power than in the first power state but less power than in the second power state.

10. The playback device of claim 1, wherein the first power state and the third power state are a same power state.

11. A method of operating a playback device comprising one or more network interface components configured to communicate over a wireless network and one or more processing components comprising a processor having a plurality of power states including a first power state, a second power state, and a third power state, wherein the processor consumes more power in the second power state than in the first power state, the method comprising:
 using the one or more network interface components:
  determining whether the wireless network is within range; and
  responsive to determining that the wireless network is within range, providing an output signal to the one or more processing components; and
 using the one or more processing components:
  detecting, by the one or more processing components, the output signal from the one or more network interface components;
  responsive to detecting of the output signal from the one or more network interface components:
  causing the processor to transition from the first power state to the second power state;
  after causing the processor to transition from the first power state to the second power state, communicating with a computing device over the wireless network; and
  after communicating with the computing device over the wireless network, causing the processor to transition from the second power state to the third power state;
  while the processor is in the third power state, (a) receiving, via the wireless network, a first command, and (b) based on the first command, causing the processor to transition from the third power state to the second power state; and
  while the processor is in the second power state, (a) receiving a second command, and (c) based on the second command, (i) obtaining, over the wireless network, audio content via the one or more network interface components using the processor and (ii) playing, via one or more amplifiers of the playback device and one or more speakers of the playback device, the audio content.

12. The method of claim 11, wherein communicating with the computing device comprises:
 obtaining registration information associated with a remote server from the computing device via the one or more network interface components using the processor; and
 storing the registration information from the computing device in a memory.

13. The method of claim 12, wherein obtaining, over the wireless network, audio content via the one or more network interface components comprises:
 retrieving the registration information from the memory using the processor; and
 based on the registration information, communicating with the remote server over the wireless network via the network interface components using the processor.

14. The method of claim 11, wherein determining whether the wireless network is within range comprises:
 receiving a message comprising a service set identifier (SSID); and
 determining whether the wireless network is in range based on the message, wherein determining whether the wireless network is in range comprises determining whether the wireless network is in range based at least on the SSID in the message.

15. The method of claim 14, wherein determining whether the wireless network is in range based on the message further comprises:
 determining a received signal strength indicator (RSSI) value associated with the message; and
 determining whether the wireless network is in range further based on the RSSI value associated with the message.

16. A playback device comprising:
 one or more amplifiers configured to drive one or more speakers;
 one or more network interface components for communicating over a first wireless network using a first communication protocol and communicating over a second wireless network using a second communication protocol, wherein the one or more network interface components comprise a network circuit configured to:
  determine whether the second wireless network is within range of the playback device; and
  output a signal based on a determination that the second wireless network is within range;
 at least one non-transitory computer-readable medium;
 one or more processing components comprising a first processor and a second processor, wherein the second processor has a plurality of power states including a first power state, a second power state, and a third power state, and wherein the second processor consumes more power in the second power state than in the first power state; and
 program instructions stored on the at least one non-transitory computer-readable medium that are executable by the one or more processing components such that the playback device is configured to:
  receive first audio content from a first computing device via the first wireless network;

play, via the one or more amplifiers and the one or more speakers, the first audio content using the first processor;

detect, by the one or more processing components, the output signal from the one or more network interface components;

based on detection of the output signal from the one or more network interface components;
- cause the second processor to transition from the first power state to the second power state;
- after causing the processor to transition from the first power state to the second power state, communicate with a second computing device over the wireless network; and
- after communicating with the second computing device over the wireless network, cause the second processor to transition from the second power state to the third power state;

while the second processor is in the third power state, (a) receive, via the wireless network, a first command, and (b) based on the first command, cause the second processor to transition from the third power state to the second power state; and while the second processor is in the second power state:
- receive a second command, and
- based on the second command, (i) obtain, over the second wireless network, second audio content via the one or more network interface components using the second processor and (ii) play, via the one or more amplifiers and the one or more speakers, the second audio content.

17. The playback device of claim 16, wherein the first communication protocol is a BLUETOOTH protocol and wherein the second communication protocol is an IEEE 802.11 protocol.

18. The playback device of claim 16, wherein the program instructions that are executable by the one or more processing components such that the playback device is configured to receive the second command comprise program instructions that are executable by the one or more processing components such that the playback device is configured to receive the second command while playing the first audio content.

19. The playback device of claim 16, further comprising program instructions stored on the at least one non-transitory computer-readable medium that are executable by the one or more processing components such that the playback device is configured to: based on receipt of the second command, stop playback of the first audio content.

20. The playback device of claim 16, wherein the program instructions that are executable by the one or more processing components such that the playback device is configured to receive the second command comprise program instructions that are executable by the one or more processing components such that the playback device is configured to receive the second command from the second computing device.

* * * * *